(12) United States Patent
Fujii et al.

(10) Patent No.: US 8,792,391 B2
(45) Date of Patent: Jul. 29, 2014

(54) COMMUNICATION APPARATUS, COMMUNICATION METHOD THEREFOR, AND PROGRAM

(71) Applicant: Canon Kabushiki Kaisha, Tokyo (JP)

(72) Inventors: Kenichi Fujii, Tokyo (JP); Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/786,308

(22) Filed: Mar. 5, 2013

(65) Prior Publication Data

US 2013/0184017 A1    Jul. 18, 2013

Related U.S. Application Data

(62) Division of application No. 12/519,511, filed as application No. PCT/JP2008/051610 on Jan. 25, 2008, now Pat. No. 8,411,592.

(30) Foreign Application Priority Data

Jan. 29, 2007 (JP) ................................. 2007-017879

(51) Int. Cl.
*H04W 84/20* (2009.01)

(52) U.S. Cl.
USPC ............................ 370/255; 370/338; 370/401

(58) Field of Classification Search
None
See application file for complete search history.

(56) References Cited

U.S. PATENT DOCUMENTS

| | | | |
|---|---|---|---|
| 6,587,126 B1 | 7/2003 | Wakai et al. | 345/744 |
| 6,744,740 B2 | 6/2004 | Chen | 370/255 |
| 6,947,156 B1 | 9/2005 | Jeyachandran et al. | 358/1.15 |
| 7,313,383 B2 | 12/2007 | Fujii | 455/410 |
| 7,555,056 B2 | 6/2009 | Hara et al. | 375/295 |
| 7,697,932 B2 | 4/2010 | Nakajima | 455/435.1 |
| 7,720,477 B2 | 5/2010 | Moritomo et al. | 455/435.1 |
| 7,742,742 B2 | 6/2010 | Watanabe et al. | 455/41.2 |
| 7,882,196 B2 | 2/2011 | Fujii et al. | 709/208 |
| 7,882,234 B2 | 2/2011 | Watanabe et al. | 709/227 |
| 7,929,947 B2 | 4/2011 | Shimura et al. | 455/411 |

(Continued)

FOREIGN PATENT DOCUMENTS

| | | |
|---|---|---|
| CN | 1855864 | 11/2006 |
| CN | 1855866 | 11/2006 |

(Continued)

OTHER PUBLICATIONS

Chinese Office Action dated Nov. 24, 2011 in corresponding Chinese Application No. 200880003149.8. (with English translation).

(Continued)

*Primary Examiner* — Hassan Phillips
*Assistant Examiner* — Duc Duong
(74) *Attorney, Agent, or Firm* — Fitzpatrick, Cella, Harper & Scinto

(57) ABSTRACT

A communication apparatus searches for another network after a network is created, participates in another network in accordance with a role, in communication parameter setting processing, of a communication apparatus existing in another network, and executes the communication parameter setting processing. After the communication apparatus decides to receive the communication parameters from another communication apparatus, the communication apparatus determines an activation state of a providing function of a provider apparatus of the communication parameters, and requests the provider apparatus to provide the communication parameters in accordance with the determination.

8 Claims, 14 Drawing Sheets

(56) References Cited

U.S. PATENT DOCUMENTS

| | | | |
|---|---|---|---|
| 7,966,016 B2 | 6/2011 | Moritomo | 455/436 |
| 8,014,378 B1 | 9/2011 | Yoon et al. | 370/350 |
| 8,150,310 B2 | 4/2012 | Goto | 455/7 |
| 8,411,592 B2* | 4/2013 | Fujii et al. | 370/255 |
| 2003/0007461 A1* | 1/2003 | Chen et al. | 370/254 |
| 2003/0115339 A1 | 6/2003 | Hodoshima | 709/228 |
| 2005/0083859 A1 | 4/2005 | Kang | 370/254 |
| 2006/0018295 A1 | 1/2006 | Choi et al. | 370/338 |
| 2006/0203837 A1 | 9/2006 | Shvodian | |
| 2006/0246941 A1 | 11/2006 | Watanabe et al. | 455/552.1 |
| 2006/0268744 A1 | 11/2006 | Sakai et al. | 370/254 |
| 2006/0268800 A1 | 11/2006 | Sugaya et al. | 370/338 |
| 2006/0282541 A1 | 12/2006 | Hiroki | 709/228 |
| 2007/0002739 A1 | 1/2007 | Fujii et al. | 370/230 |
| 2007/0002884 A1 | 1/2007 | Jaakkola et al. | 370/431 |
| 2007/0043844 A1 | 2/2007 | Sakai | 709/223 |
| 2007/0086426 A1 | 4/2007 | Bonta et al. | 370/350 |
| 2007/0189322 A1 | 8/2007 | Hirose | 370/447 |
| 2008/0026795 A1 | 1/2008 | Fujii | 455/561 |
| 2008/0089300 A1 | 4/2008 | Yee | 370/338 |
| 2009/0028341 A1 | 1/2009 | Hamachi | 380/278 |
| 2009/0092060 A1 | 4/2009 | Goto | 370/254 |
| 2009/0092068 A1 | 4/2009 | Moritomo et al. | 370/311 |
| 2009/0168701 A1* | 7/2009 | White et al. | 370/328 |

FOREIGN PATENT DOCUMENTS

| | | |
|---|---|---|
| EP | 1241838 A2 | 9/2002 |
| EP | 1718013 A1 | 11/2006 |
| JP | 2003-338821 | 11/2003 |
| JP | 2004-266870 | 9/2004 |
| JP | 2006-042337 | 2/2006 |
| JP | 2006-311139 | 11/2006 |
| KR | 10-2006-113481 | 11/2006 |
| KR | 10-2006-113482 | 11/2006 |
| WO | 2007/061140 | 5/2007 |
| WO | 2007/094183 | 8/2007 |
| WO | 2008/047884 | 4/2008 |
| WO | 2008/050622 | 5/2008 |
| WO | 2008/050815 | 5/2008 |
| WO | 2008/053688 | 5/2008 |

OTHER PUBLICATIONS

International Search Report dated Feb. 26, 2008 in corresponding International Application No. PCT/JP2008/051610.

European Search Report dated Oct. 4, 2013 in European Appl. No. 08704319.6.

* cited by examiner

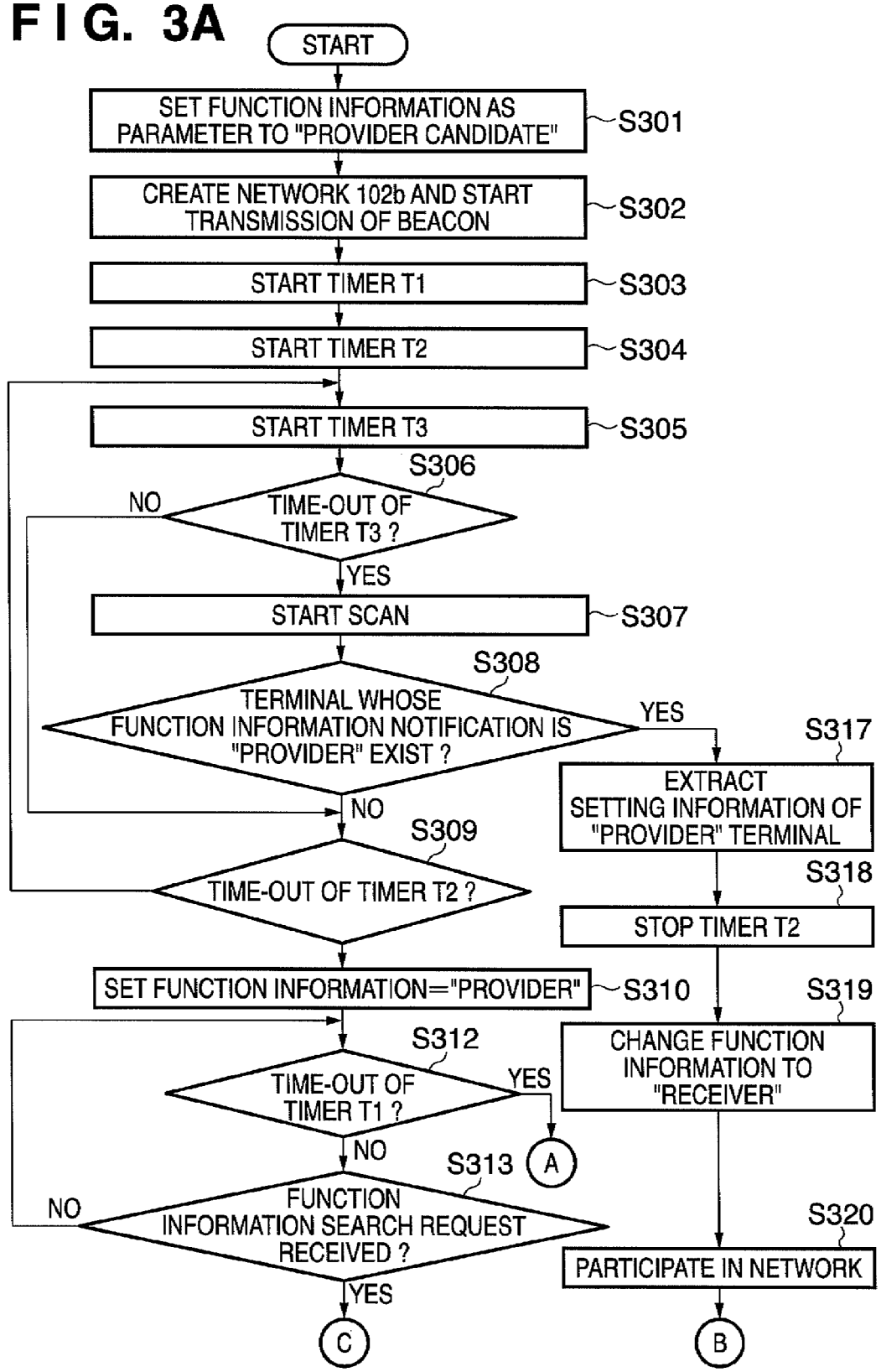

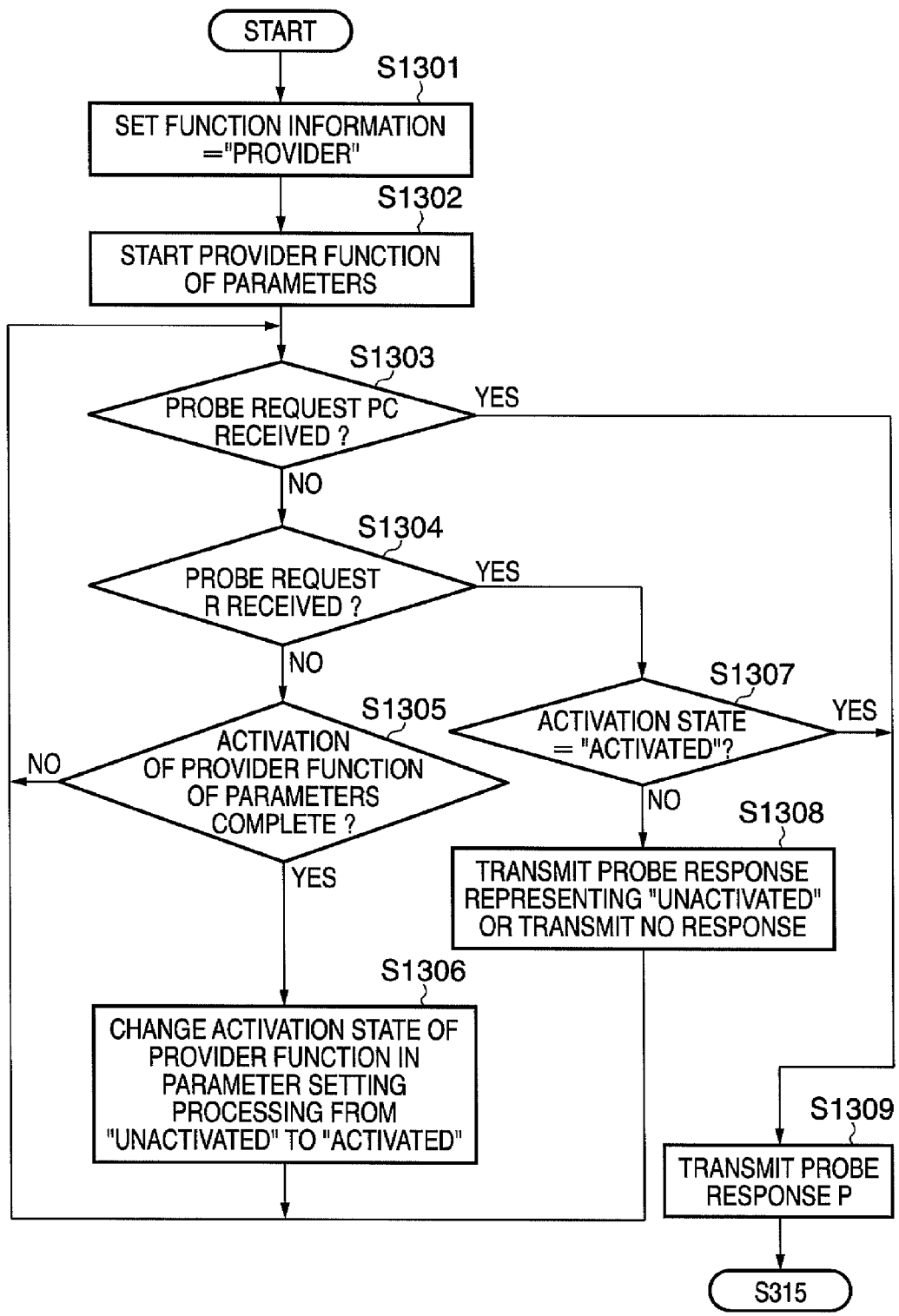

COMMUNICATION APPARATUS, COMMUNICATION METHOD THEREFOR, AND PROGRAM

This application is a divisional of U.S. patent application Ser. No. 12/519,511, filed Jun. 16, 2009(currently pending), which is a national stage under §371 of PCT/JP2008/051610, filed Jan. 25, 2008, which are incorporated by reference herein in their entirety, as if fully set forth herein, and claims the benefit of priority under 35 U.S.C §119, based on Japanese priority Application No. 2007-017879, filed Jan. 29, 2007, which is incorporated by reference herein in its entirety, as if fully set forth herein.

TECHNICAL FIELD

The present invention relates to a processing technique for setting communication parameters in a communication apparatus.

BACKGROUND ART

In wireless communication represented by a wireless LAN complying with the IEEE802.11 standard series, there are many setting items to be set in advance. The setting items include wireless parameters necessary for wireless communication, such as an SSID as a network identifier, an encryption scheme, an encryption key, an authentication scheme, and an authentication key. It is very troublesome for a user to manually set them.

Various manufacturers have proposed automatic setting methods for easily setting wireless parameters in a wireless apparatus. In those automatic setting methods, one apparatus provides another apparatus with wireless parameters using a procedure predetermined between these connected apparatuses and a message, thereby automatically setting the wireless parameters.

As for the wireless parameter automatic setting method, each manufacturer often employs its own method. Procedures for setting wireless parameters or interpretable messages are different between apparatuses which do not support a common wireless parameter automatic setting method. In this case, it is impossible to set wireless parameters using the automatic setting method. On the other hand, between apparatuses which support a common wireless parameter automatic setting method, it is possible to easily set wireless parameters using the automatic setting method.

In recent years, game machines and household appliances are also provided with a wireless function. Some of them not only execute communication within a network managed by a wireless base station, but also establish ad hoc connection for directly connecting the devices and communicating with each other without intervening the base station.

Japanese Patent Laid-Open Nos. 2003-338821 and 2004-266870 disclose examples of wireless parameter automatic setting.

To start communication between a wireless base station and a wireless communication terminal, the wireless communication terminal participates (joins) in a network which has been already created by the base station, starts wireless parameter setting, and acquires wireless parameter information from the base station.

However, in ad hoc connection for direct communication between devices, the devices create different networks since each device can create a network by itself. As a result, the devices may not communicate with each other. Each device, therefore, has to start communication using parameters (temporary parameters for setting) such as a specified SSID and frequency. After the devices create a single network, they need to communicate with each other to acquire formal wireless parameters and to set the acquired wireless parameters.

The above-mentioned temporary parameters for setting are commonly used for the devices. If the temporary parameters leak to a third party, the wireless parameters also leak, and security problems arise.

When an undesired device starts wireless parameter setting accidentally at the same time, information about wireless parameters may be erroneously exchanged with that device. Furthermore, unlike transfer between a base station and a wireless communication terminal, a wireless parameter setting scheme in ad hoc connection does not uniquely define the transfer direction of wireless parameters.

This requires a user to select a network in which the user participates (joins) and the transfer direction of parameters. A problem that the operability of the user deteriorates arises.

The above problems may arise not only for wireless parameters but also for wired communication parameters which need to be set for communication between devices.

DISCLOSURE OF INVENTION

The present invention has been made in consideration of the above-described problems, and has as its object to solve one or more of the above-described problems.

According to one aspect of the present invention, a communication apparatus comprises: a creation unit adapted to create a network; a search unit adapted to search for another network after the network is created by the creation unit; a determination unit adapted to determine a role, in communication parameter setting processing, of another communication apparatus existing in the other network searched by the search unit; a join unit adapted to join in the other network in accordance with the role of the other communication apparatus which is determined by the determination unit; and a setting unit adapted to execute the communication parameter setting processing for network communication with the other communication apparatus after the apparatus joins in the other network by the join unit.

According to another aspect of the present invention, a communication apparatus comprises: a decision unit adapted to decide whether to provide communication parameters for network communication to another communication apparatus or receive the communication parameters from the other communication apparatus; a checking unit adapted to check a provider apparatus of the communication parameters; a determination unit adapted to determine an activation state of a communication parameter providing function of the provider apparatus of the communication parameters after the decision unit decides that the apparatus receives the communication parameters from the other communication apparatus; and a request unit adapted to request the other communication apparatus to provide the communication parameters in accordance with the determination by the determination unit.

According to still another aspect of the present invention, a communication method for a communication apparatus comprises the steps of: creating a network; searching for another network after the network is created in the creating step; determining a role, in communication parameter setting process, of the other communication apparatus existing in the other network searched in the searching step; joining in the other network in accordance with the role of the other communication apparatus which is determined in the determining step; and executing communication parameter setting processing for network communication with the other communication apparatus after the communication apparatus joins in the other network in the participating step.

According to yet another aspect of the present invention, a communication method for a communication apparatus comprises the steps of: deciding whether to provide communication parameters for network communication to another communication apparatus or receive the communication parameters from the other communication apparatus; checking a provider apparatus of the communication parameters; determining an activation state of a communication parameter providing function of the provider apparatus of the communication parameters after it is decided in the deciding step that the communication apparatus receives the communication parameters from the other communication apparatus; and requesting the other communication apparatus to provide the communication parameters in accordance with the determination in the determining step.

According to still yet another aspect of the present invention, a computer program causes a computer to execute the steps of: creating a network; searching for another network after the network is created in the creating step; determining a role, in communication parameter setting processing, of another communication apparatus existing in the other network detected in the searching step; participating in the other network in accordance with the role of the other communication apparatus which is determined in the determining step; and executing communication parameter setting processing for network communication with the other communication apparatus after a communication apparatus participates in the other network in the participating step.

According to yet still another aspect of the present invention, a computer program causes a computer to execute the steps of: deciding whether to provide communication parameters for network communication to another communication apparatus or receive the communication parameters from the other communication apparatus; checking a provider apparatus of the communication parameters; determining an activation state of a communication parameter providing function of the provider apparatus of the communication parameters after it is decided in the deciding step that a communication apparatus receives the communication parameters from the other communication apparatus; and requesting the other communication apparatus to provide the communication parameters in accordance with the determination in the determining step.

According to the present invention, it is possible to reduce the probability of failure of wireless parameter setting processing. Even if, for example, communication apparatuses create different networks, they can perform wireless parameter setting processing for a target network. When it takes time to activate a function for setting communication parameters, it is possible to execute wireless parameter setting processing.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 3A and 3B are flowcharts showing operation of a terminal according to the first to fourth embodiments.

FIG. 13 is a flowchart showing operation of the terminal 100b according to the fourth embodiment.

BEST MODE FOR CARRYING OUT THE INVENTION

Preferred embodiments of the present invention will be explained below with reference to the accompanying drawings. Components described in these embodiments are merely examples, and do not limit the scope of the invention.

<First Embodiment>

Figure 1:
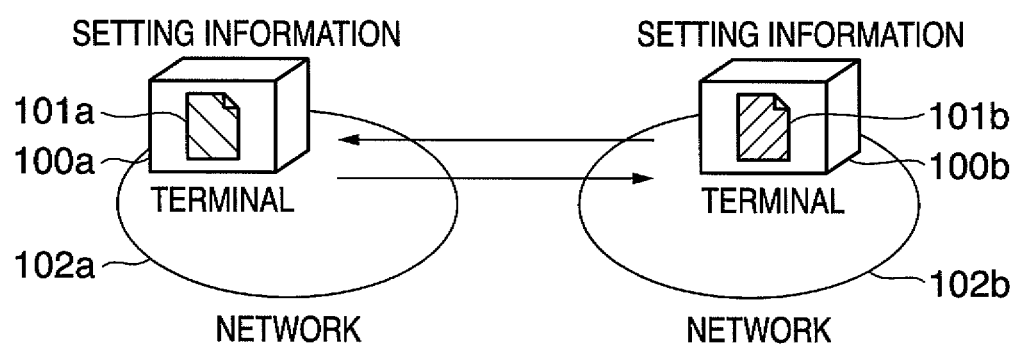
FIG. 1 is a view showing a case in which two terminals create an ad hoc network according to the first to fourth embodiments.
Figure 2:
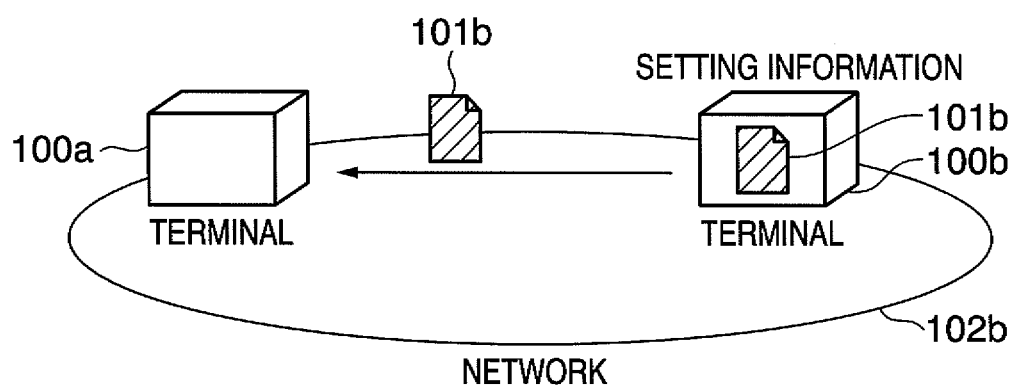
FIG. 2 is a view showing a case in which two terminals set wireless parameters according to the first to fourth embodiments.

FIGS. 1 and 2 show network configuration examples for explaining the first embodiment.

In the configuration shown in FIG. 1, there exist terminals 100a and 100b each having a wireless communication function using IEEE802.11 wireless LAN.

The terminals 100a and 100b each have a wireless parameter automatic setting application. In the wireless parameter automatic setting application according to the first embodiment, one terminal provides another terminal with wireless parameters for wireless communication. Assume that the wireless parameters include some or all of an SSID (Service Set Identifier) as a network identifier, a frequency channel, an encryption scheme, an encryption key, an authentication scheme, and an authentication key. Each of the terminals sets the wireless parameters which the terminal has provided or received. The terminals create a network using the wireless parameters, and communicate with each other via the network. The wireless parameters are provided using a predetermined procedure and a message by means of a packet which can be communicated even if all the wireless parameters of the communication terminals do not match. If the SSIDs and the frequency channels match respectively, it is possible to provide/receive the wireless parameters without encryption and authentication, and to communicate using encryption and authentication by newly setting the wireless parameters which the terminal has provided or received. Thus, a network which provides wireless parameters and that which communicates after provision can be same or different.

The terminal 100a in FIG. 1 stores wireless parameter setting information 101a as wireless parameter setting information for wireless communication in a memory, and creates a network 102a. The terminal 100b stores wireless parameter setting information 101b in a memory, and creates a network 102b. Assume that the wireless parameter setting information includes wireless parameters for wireless communication, such as an SSID as a network identifier, a frequency channel, an encryption scheme, an encryption key, an authentication scheme, and an authentication key. Each terminal performs wireless communication by ad hoc communication in an IEEE802.11 wireless LAN ad hoc mode.

FIG. 2 is a view showing operation of transmitting (providing) the wireless parameter setting information 101b from the terminal 100b to the terminal 100a on the same network 102b when the terminal 100b is determined as a provider terminal of wireless parameters.

Figure 9:
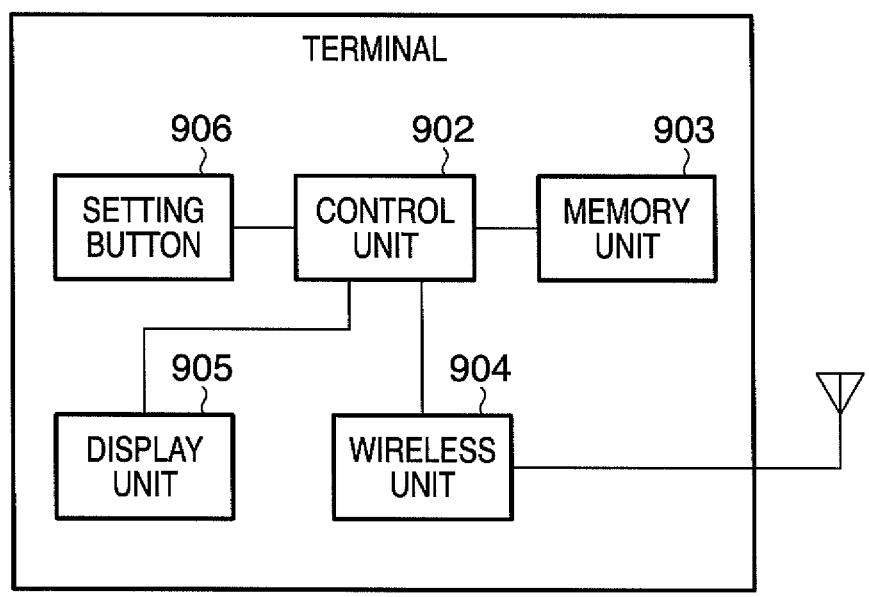
FIG. 9 is a block diagram showing the configuration of a terminal according to the first to fourth embodiments.

FIG. 9 is a block diagram showing the configuration of the terminals 100a and 100b according to the first embodiment. A control unit 902, which consists of a computer such as a CPU, executes a program stored in a memory unit 903 to perform various processes (to be described later). The control unit 902 executes a wireless parameter automatic setting application to perform wireless parameter automatic setting (to be described later). When the control unit 902 executes the wireless parameter automatic setting, a provider terminal provides a receiver terminal with wireless parameters and both terminals store identical wireless parameters. When the identical wireless parameters are automatically or manually set, the terminals can create a network using the wireless parameters, and communicate with each other via the network. The memory unit 903 stores a program and various pieces of information for executing various processes (to be described later) by the control unit 902. The memory unit 903 stores the wireless parameters set by the wireless parameter automatic setting performed by the control unit 902 as well as the wireless parameter setting information 101a and 101b. A wireless unit 904 uses the wireless parameters set in the memory unit 903 to execute wireless LAN communication complying with the IEEE802.11. A display unit 905 provides various displays, and has a function capable of outputting visually perceivable information like an LCD or LED, or a function capable of outputting sound like a loudspeaker. A setting button 906 triggers a start of the wireless parameter automatic setting. When a user operates the setting button 906, the control unit 902 starts the wireless parameter automatic setting.

When the user operates the setting button 906, each of the terminals 100a and 100b starts wireless parameter automatic setting (to be described later). Only the operation of the terminal 100b will be explained below for the sake of simplicity.

Figure 3B:
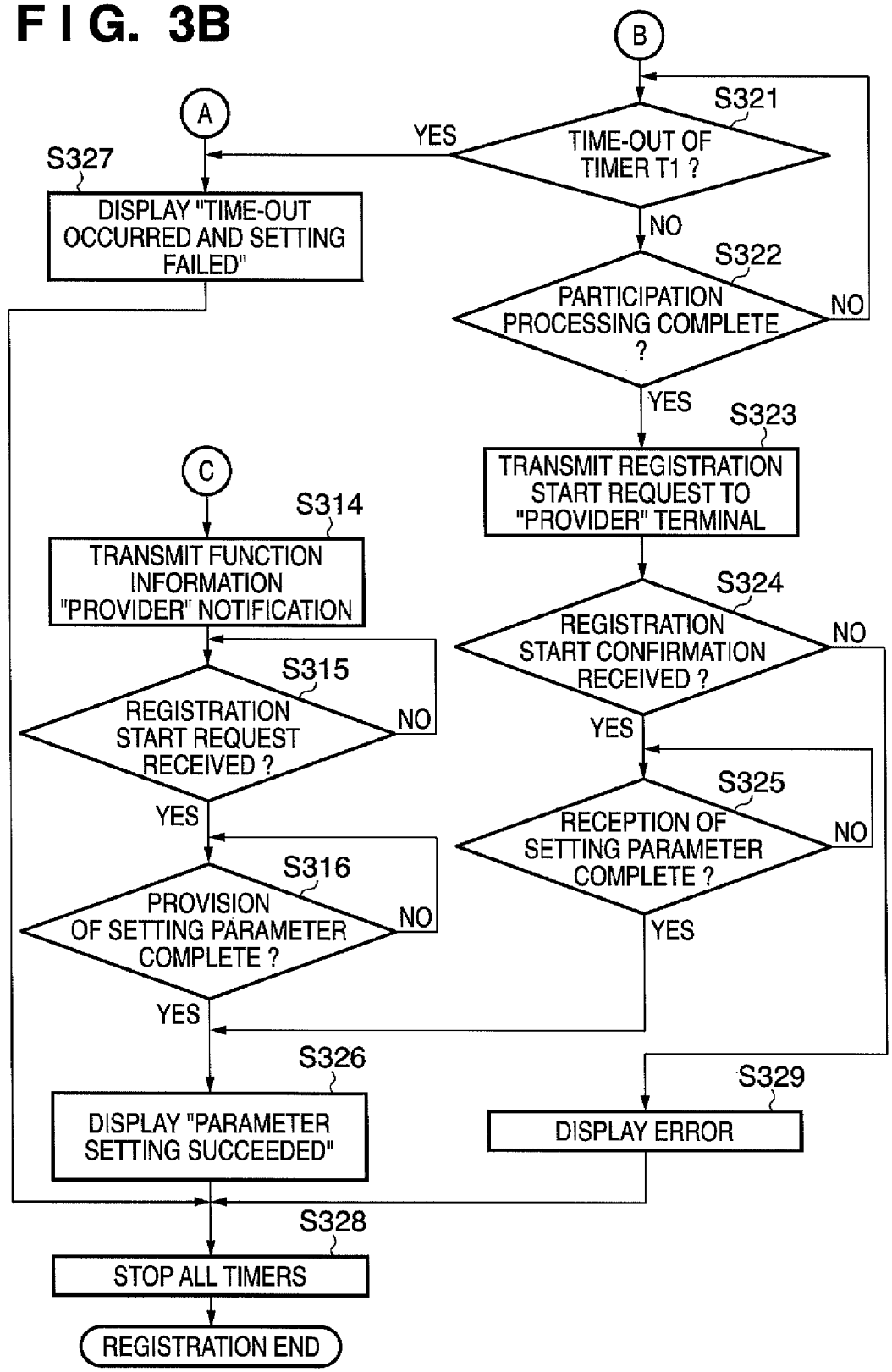
Figure 4:
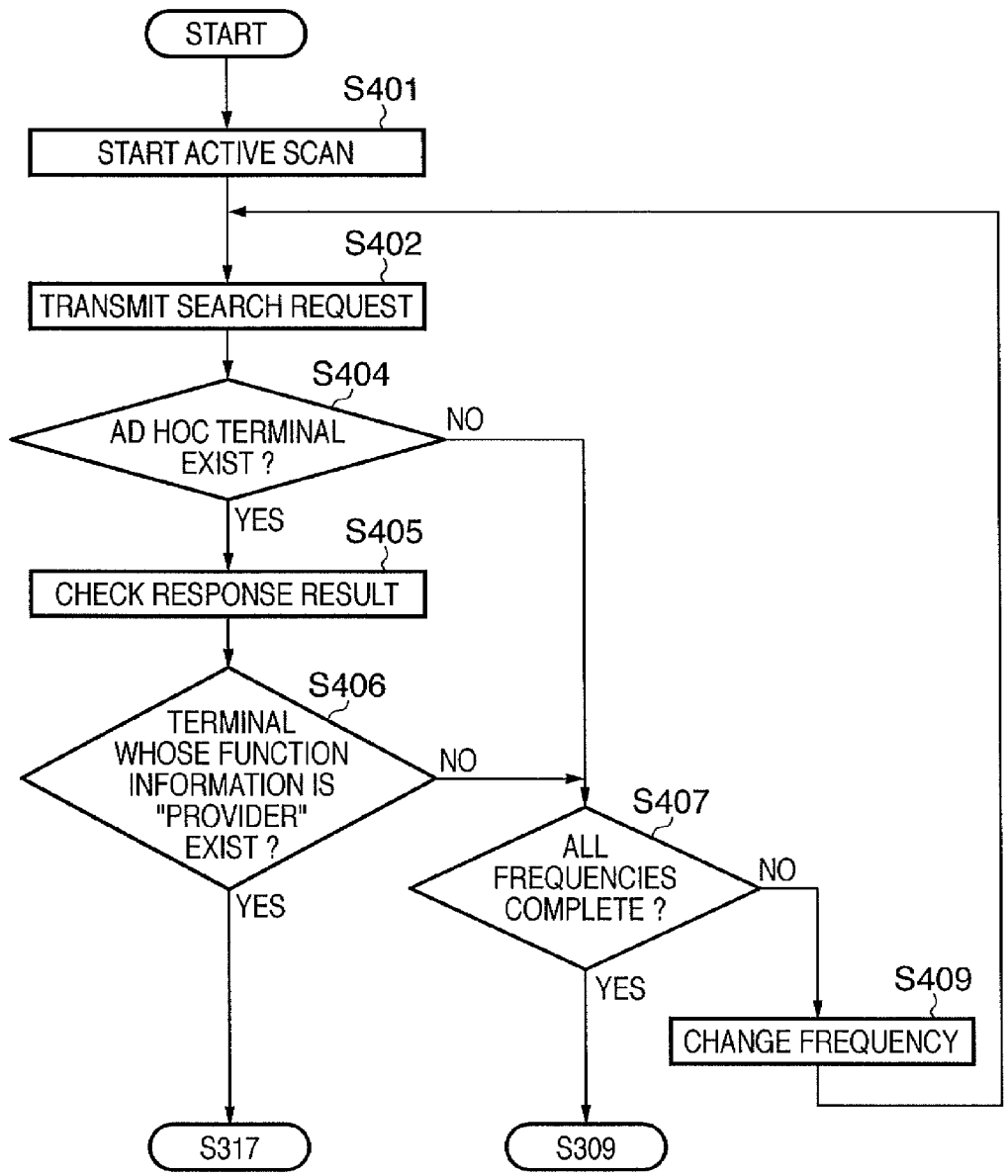
FIG. 4 is a flowchart showing operation in detail when an active scan is performed in the first embodiment.

FIG. 3A to FIG. 4 are flowcharts showing operation of the wireless parameter setting processing. The operation shown in FIG. 3A to FIG. 4 is done when the program stored in the memory unit 903 runs on the control unit 902.

When the user operates the setting button 906 and the wireless parameter automatic setting processing starts, the terminal 100b sets function information representing a role in the wireless parameter automatic setting processing to "Provider Candidate" representing a wireless parameter provision enable state (step S301). The terminal 100b creates the network 102b using wireless parameters including an SSID as a network identifier and a frequency channel which are randomly selected, and starts transmitting a beacon signal (step S302).

A timer T1 is started (step S303), which represents the time-out of the whole wireless parameter automatic setting processing. A timer T2 is started (step S304), which represents a period of time until the function information is confirmed as "Provider" or "Receiver" after it is set to "Provider Candidate" meaning that it is unconfirmed. A timer T3 is also started (step S305), which represents intervals at which surrounding networks are periodically searched for. Assume that the relationship among the timers is T1>T2>T3. The values of the timers T1, T2, and T3 can be random values or predetermined values. When the time-out of the timer T3 occurs (step S306), the terminal 100b starts scanning surrounding networks (step S307). In this case, all frequency channels to be used are scanned to search for a terminal on a network. When a terminal whose function information is confirmed as "Provider" is found as a result of the scan (step S308), wireless parameter setting information of a network in which the "Provider" terminal exists is extracted (step S317), and the timer T2 is stopped (step S318). The wireless parameter setting information (e.g., an SSID) is contained in a beacon signal of the network in which the "Provider" terminal exists. It is, therefore, possible to extract the setting information by receiving the beacon signal. The frequency channel corresponds to a frequency channel at which the "Provider" terminal is found. If the terminal 100a whose function information is "Provider" is found as a result of the scan by the terminal 100b, the terminal 100b extracts the wireless parameter setting information 101a of the network 102a from a beacon signal transmitted by the terminal 100a.

The terminal 100b changes its function information from "Provider Candidate" to "Receiver", and confirms it (step S319). The terminal 100b executes processing of participating (joining) in the network in which the "Provider" terminal exists by using the extracted setting information (step S320). If, for example, the terminal 100a is the "Provider" terminal, the terminal 100b participates (joins) in the network 102a. The terminal 100b confirms that the time-out of the timer T1 has not occurred (step S321), and then waits for completion of the participation (join) processing (step S322). If the processing of participating (joining) in the network of the "Provider" terminal is complete before the time-out of the timer T1 occurs (step S322), the terminal 100b transmits a registration start request signal to the "Provider" terminal by using a MAC address of that terminal (step S323). Upon receiving a registration start confirmation signal from the "Provider" terminal (step S324), the terminal 100b receives wireless parameters from the "Provider" terminal. When the terminal 100b receives the wireless parameters, and storage and setting of the wireless parameters in the memory unit 903 are complete (step S325), the terminal 100b displays information representing "parameter setting succeeded" on the display unit 905 (step S326). And, after stopping all the timers, the wireless parameter automatic setting processing ends (step S328). After the wireless parameters are set, a network using the set wireless parameters is created. This makes it possible to communicate using the wireless parameters set in the network.

When a period of time elapses after the registration start request signal is transmitted, the terminal 100b has not received the registration start confirmation signal from the "Provider" terminal. In this case, the terminal 100b displays an error on the display unit 905 and the process advances to step S328. If the time-out of the timer T1 occurs (step S321) before the processing of participating (joining) in the network of the "Provider" terminal is complete, the terminal 100b displays, e.g., "time-out occurred and setting failed" on the display unit 905 (step S327) and the process advances to step S328.

If a terminal whose function information is confirmed as "Provider" cannot be found as a result of the scan in step S307 (step S308), it is checked whether the time-out of the timer T2 has occurred (step S309). If a terminal whose function information represents "Provider" cannot be found until the time-out of the timer T2 occurs (step S309), the terminal 100*b* changes, confirms, and sets its function information to "Provider" (step S310). Until the time-out of the timer T1 for the whole processing occurs (step S312), the terminal 100*b* waits for reception of a function information search request from another terminal (step S313). Upon receiving the function information search request from another terminal, the terminal 100*b* transmits a notification signal in which the function information is set to "Provider" (step S314) to notify another terminal that the terminal 100*b* is a "Provider" terminal. After that, the terminal 100*b* waits for reception of a registration start request from another terminal. Upon receiving the registration start request (step S315), the terminal 100*b* transmits a registration start confirmation signal, and starts processing of providing the wireless parameter setting information 101*b*. If, for example, the terminal 100*b* is a "Provider" terminal, the terminal 100*a* finds the "Provider" terminal 100*b* by the determination in step S308. The terminal 100*a* executes steps S317 to S325 to be a "Receiver" terminal. With this processing, the "Provider" terminal 100*b* provides the "Receiver" terminal 100*a* with the wireless parameter setting information 101*b*.

Upon completion of providing the wireless parameter setting information (step S316), the terminal 100*b* displays "parameter setting succeeded" representing the success of the parameter setting on the display unit 905, stops all the timers, and terminates the processing (step S328). After the wireless parameters are set, a network using the set wireless parameter is created. This allows communication using the wireless parameters set in the network.

If the time-out of the timer T1 occurs (step S312) before the function information search request is received, the terminal 100*b* displays, e.g., "time-out occurred and setting failed" on the display unit 905 (step S327). In step S328, the terminal 100*b* stops all the timers, and terminates the processing.

Note that although a case in which a network is immediately created in step S302 has been described, the processing in step S303 and thereafter may be executed before the network is created. In this case, when the terminal 100*b* finds a "Provider" terminal, the terminal 100*b* performs the processing in step S317 and the subsequent steps, participates (joins) in a network in which the "Provider" terminal is found, and receives wireless parameter setting information from the "Provider" terminal. If the terminal 100*b* cannot find the "Provider" terminal, the terminal 100*b* starts the processing from step S301.

FIG. 4 is a flowchart showing control operation in detail when an active scan is performed as a scan method of the scan processing (steps S307 and S308) in FIG. 3A.

The terminal 100*b* starts an active scan (step S401). In this case, the terminal 100*b* selects a frequency channel, and transmits a function information search request signal at the selected frequency channel (step S402).

The search request contains information representing that function information of the terminal 100*b* is "Provider Candidate". A terminal which has received the search request returns a response signal containing its own function information. The terminal 100*b* determines whether the response signal could have been received. If the terminal 100*b* has received the response signal, it determines that a terminal using ad hoc communication exists in a network to which the search request is transmitted (step S404), checks the function information contained in the response signal (step S405), and determines whether a "Provider" terminal exists (step S406). As a result, if the "Provider" terminal exists (step S406), the process advances to step S317 of FIG. 3A.

On the other hand, if the terminal 100*b* cannot receive the response signal to the search signal within a period of time (if a terminal using ad hoc communication does not exists), the terminal 100*b* determines whether all frequency channels have been scanned (step S407). Alternatively, if the terminal 100*b* receives the response signal and function information contained in the response signal does not represent "Provider" terminal, the terminal 100*b* determines whether all the frequency channels have been scanned (step S407). If all the frequency channels have been scanned, the process advances to step S309 of FIG. 3A. If the time-out of the timer T2 has not occurred, the scan starts every time the time-out of the timer T3 occurs (step S307). If all the frequency channels have not been scanned, the terminal 100*b* changes the frequency channel (step S409), and transmits a search request signal at the changed frequency channel in step S402.

Figure 5:
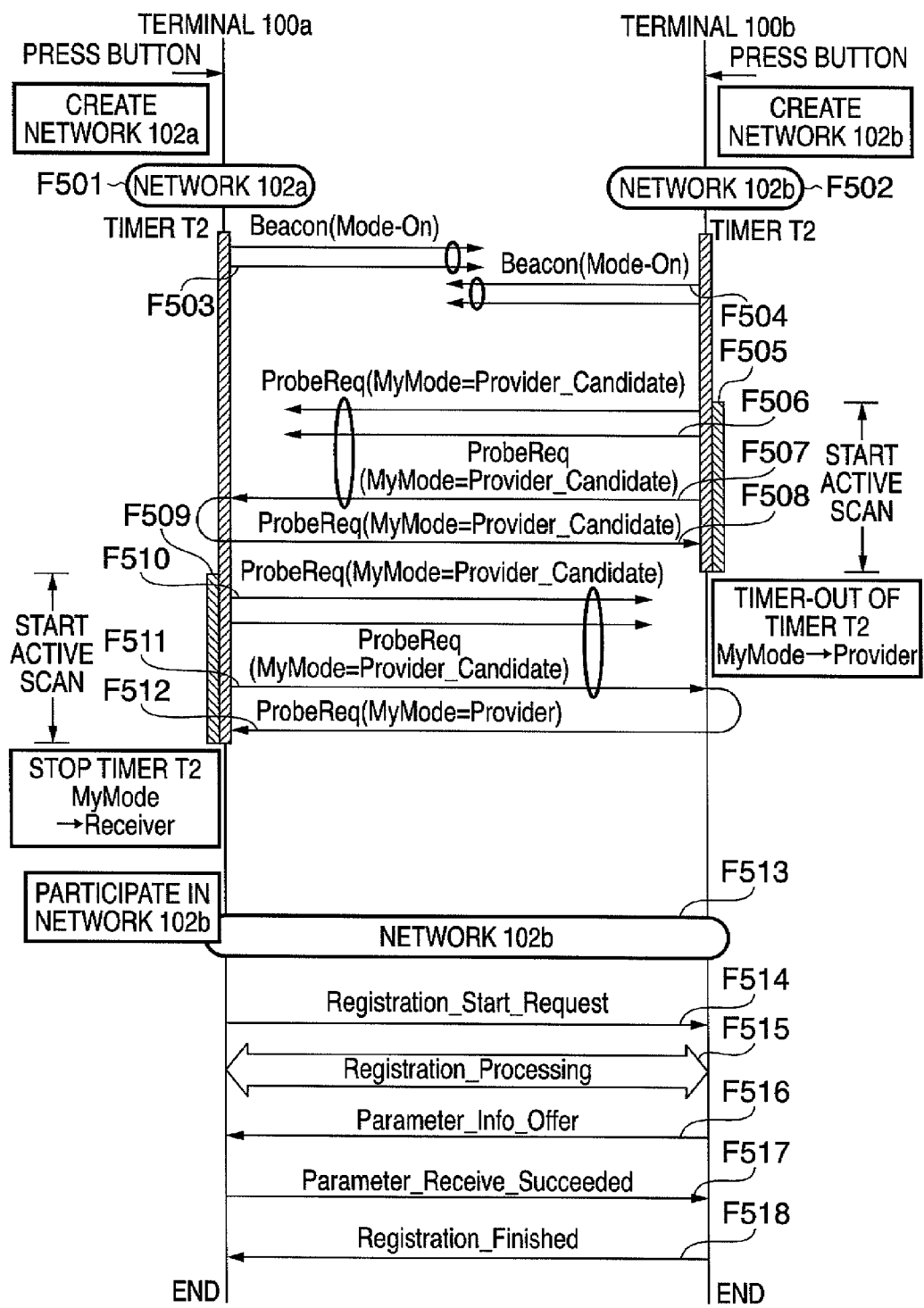
FIG. 5 is a sequence chart showing operation of terminals 100a and 100b according to the first embodiment.

FIG. 5 is a sequence chart showing processing by using a wireless LAN when the terminals 100*a* and 100*b* set wireless parameters by ad hoc communication. The operation shown in FIG. 5 is done when the program stored in the memory unit 903 runs on the control unit 902 of each terminal.

When the setting button of each of the terminals 100*a* and 100*b* is pressed for starting the wireless parameter setting, the terminals 100*a* and 100*b* create the networks 102*a* and 102*b* respectively (F501). Furthermore, each of the terminals 100*a* and 100*b* starts its timers T1, T2, and T3 (F502).

The terminal 100*a* transmits a beacon signal (Beacon (Mode-On)) representing that an automatic setting mode is active on the network 102*a* (F503). The terminal 100*b* transmits a beacon signal (Beacon(Mode-On)) representing that an automatic setting mode is active on the network 102*b* (F504).

When the time-out of the timer T3 of the terminal 100*b* occurs, the terminal 100*b* starts an active scan (F505).

When the function information represents "Provider Candidate", it is abbreviated as PC hereinafter (it is indicated by "MyMode=Provider Candidate" in FIG. 5). When the function information represents "Provider", it is abbreviated as P hereinafter (it is indicated by "MyMode=Provider" in FIG. 5).

In order to search for a terminal existing on a network at each frequency channel, the terminal 100*b* transmits, at the frequency channel, a Probe_Request (to be referred to as a probe request PC (ProbeRqPC) hereinafter) message in which "Provider Candidate" is set as its own function information (F506 and F507). The Probe_Request message corresponds to the search request signal described above.

When the terminal 100*b* transmits the search request signal (F507) in the network 102*a*, the terminal 100*a* existing at a frequency channel at which the network 102*a* is created receives the probe request PC (F507). When the terminal 100*a* receives the probe request PC (F507), it transmits a Probe_Response (to be referred to as a probe response PC (ProbeResPC) hereinafter) message in which "Provider Candidate" as its own function information is set (F508). That is, at this stage, the terminals 100*a* and 100*b* are in a state of "Provider Candidate".

When the time-out of the timer T2 occurs, the terminal 100*b* sets its function information to "Provider" (MyMode=Provider).

Similarly, the time-out of the timer T3 of the terminal 100*a* existing in the network 102*a* occurs, and the terminal 100*a* starts an active scan (F509). In order to search for terminals existing on networks at all frequencies, the terminal 100*a* transmits a Probe_Request (to be referred to as a probe request PC (ProbeReqPC) hereinafter) message in which "Provider Candidate" is set as its own function information (F510 and F511). When the terminal 100a transmits the probe request PC (F511) at a frequency at which the network 102b is created, the terminal 100b receives the probe request PC (F511). The terminal 100b transmits a Probe_Response (to be referred to as a probe response P (ProbeResP) hereinafter) message in which "Provider" as its own function information is set (F512). The terminal 100a which has received the probe response P from the terminal 100b stops the timer T2, and sets its own function information to "Receiver" (MyMode=Receiver). At this stage, it is confirmed that the terminal 100a is a "Receiver" terminal and the terminal 100b is a "Provider" terminal.

After the terminal 100a confirms that the function information of the terminal 100b is "Provider" as a result of the scan, the terminal 100a participates (joins) in the network 102b created by the terminal 100b (F513). Subsequently, the terminal 100a transmits, to the terminal 100b, a registration start request (Registration_Start_Request) message for requesting the start of the wireless parameter setting (F514). The terminals 100a and 100b perform protocol control of the wireless parameter setting processing to start the wireless parameter automatic setting processing (F515). Note that the terminal 100b transmits a registration start confirmation signal to the terminal 100a under the protocol control.

The terminal 100a receives a wireless parameter setting information (Parameter_Info_Offer) message from the terminal 100b (F516). The terminal 100a then transmits a Parameter_Receive_Succeeded response message representing the success of the reception of the wireless parameter setting information (F517). The terminal 100b which has confirmed the success of the reception of the wireless parameter setting information transmits a parameter setting end (Registration_Finished) message to the terminal 100a (F518), and terminates the processing of providing/receiving wireless parameter setting information.

Note that in the above explanation, a case in which a plurality of terminals notify another terminal of "Provider" as their function information upon scanning is regarded as a registration failure in consideration of the security. This can prevent a user from receiving/providing wireless parameter setting information from/to an unintended terminal. In the above explanation, values of the timers T1, T2, and T3 can be random values or predetermined values. A random value is, however, preferably set to the timer T2 every time the setting button 906 is operated. This prevents roles of the plurality of terminals from being confirmed simultaneously when the setting buttons 906 of the plurality of terminals are operated at the same time. With this processing, it is possible to reduce the probability of a registration failure due to simultaneous confirmation of the roles of the plurality of terminals as "Provider".

According to the first embodiment, as described above, it is possible to execute setting processing for providing/receiving communication parameters even if a plurality of communication apparatuses create different networks. In accordance with a role in the setting processing of providing/receiving communication parameters, it is also possible to integrate the plurality of networks into one network, and perform the setting processing. To set wireless parameters by ad hoc communication, even if a user does not specify whether the role is to be a provider terminal or a receiver terminal for the wireless parameter setting, it is possible to determine networks in which terminals can autonomously communicate with each other. After that, the networks can be integrated, and the wireless parameter setting processing can be performed in accordance with the role.

<Second Embodiment>

The second embodiment will now be explained below. The second embodiment has scan processing different from the scan processing (steps S307 and S308) of FIG. 3A described in the first embodiment. Other processing and the configuration of terminals are the same as those in the first embodiment, and a description thereof will be omitted.

Figure 6:
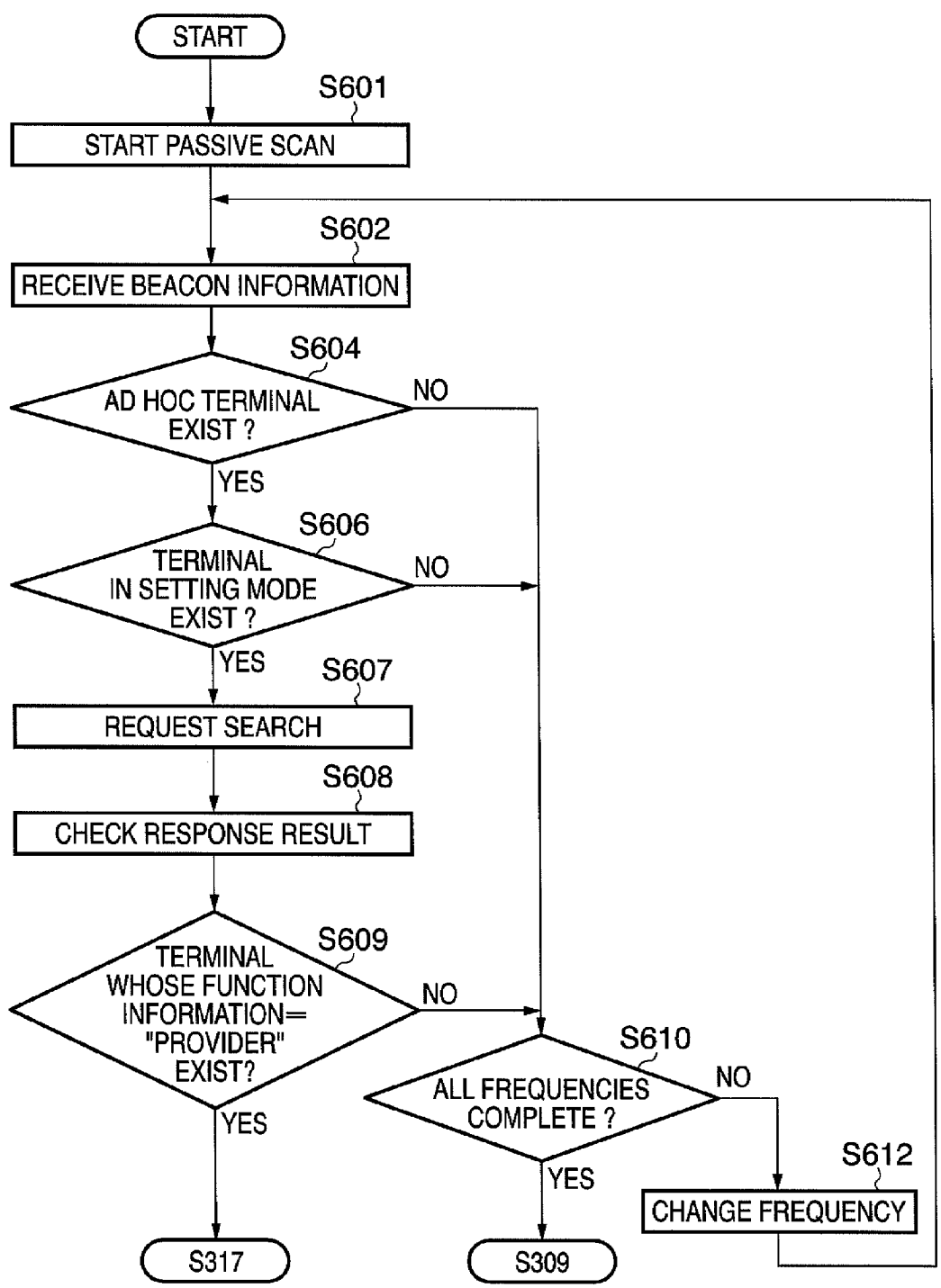
FIG. 6 is a flowchart showing operation in detail when a passive scan is performed in the second embodiment.

FIG. 6 is a flowchart showing control processing in detail when a passive scan is performed as a scan method of the scan processing (steps S307 and S308) in FIG. 3A. The operation shown in FIG. 6 is done when a program stored in a memory unit 903 runs on a control unit 902 of a terminal which executes the scan processing.

A terminal 100b starts a passive scan (step S601). In this case, in order to determine whether a beacon signal is transmitted in a network existing at each frequency channel, the terminal 100b selects a frequency channel, and monitors the beacon signal during a period of time (step S602). Upon receiving the beacon signal, the terminal 100b determines that a terminal using ad hoc communication exists (step S604), and checks if the received beacon signal contains information representing that an automatic setting mode is active (step S606). If the received beacon signal contains the information representing that the automatic setting mode is active, the terminal 100b transmits a search request to the terminal which has transmitted the beacon signal in order to check function information of that terminal (step S607). The search request contains information representing that the function information of the terminal 100b is "Provider Candidate". The terminal which has received the search request returns a response signal containing its own function information.

Upon receiving the response signal to the search request, the terminal 100b checks the function information contained in the response signal (step S608) to determine whether the response terminal is a "Provider" terminal (step S609). If the terminal which has transmitted the response signal is a "Provider" terminal, the process advances to step S317 of FIG. 3A.

If the terminal 100b cannot receive the beacon signal in step S602 (if a terminal using ad hoc communication does not exist) (step S604), the terminal 100b determines whether all frequency channels have been scanned (step S610). If the terminal 100b receives the beacon signal but the received beacon signal does not contain the information representing that the automatic setting mode is active (step S606), the terminal 100b determines whether all the frequency channels have been scanned (step S610). Also, if the terminal which has transmitted the response signal is not a "Provider" terminal (step S609), it is determined whether all the frequency channels have been scanned (step S610). If all the frequency channels have been scanned, the process advances to step S309 of FIG. 3A. If the time-out of a timer T2 has not occurred, the terminal 100b starts a scan every time the time-out of a timer T3 occurs (step S307). If all the frequency channels have not been scanned, the terminal 100b changes the frequency channel (step S612), and monitors the beacon signal in step S602.

Figure 7:
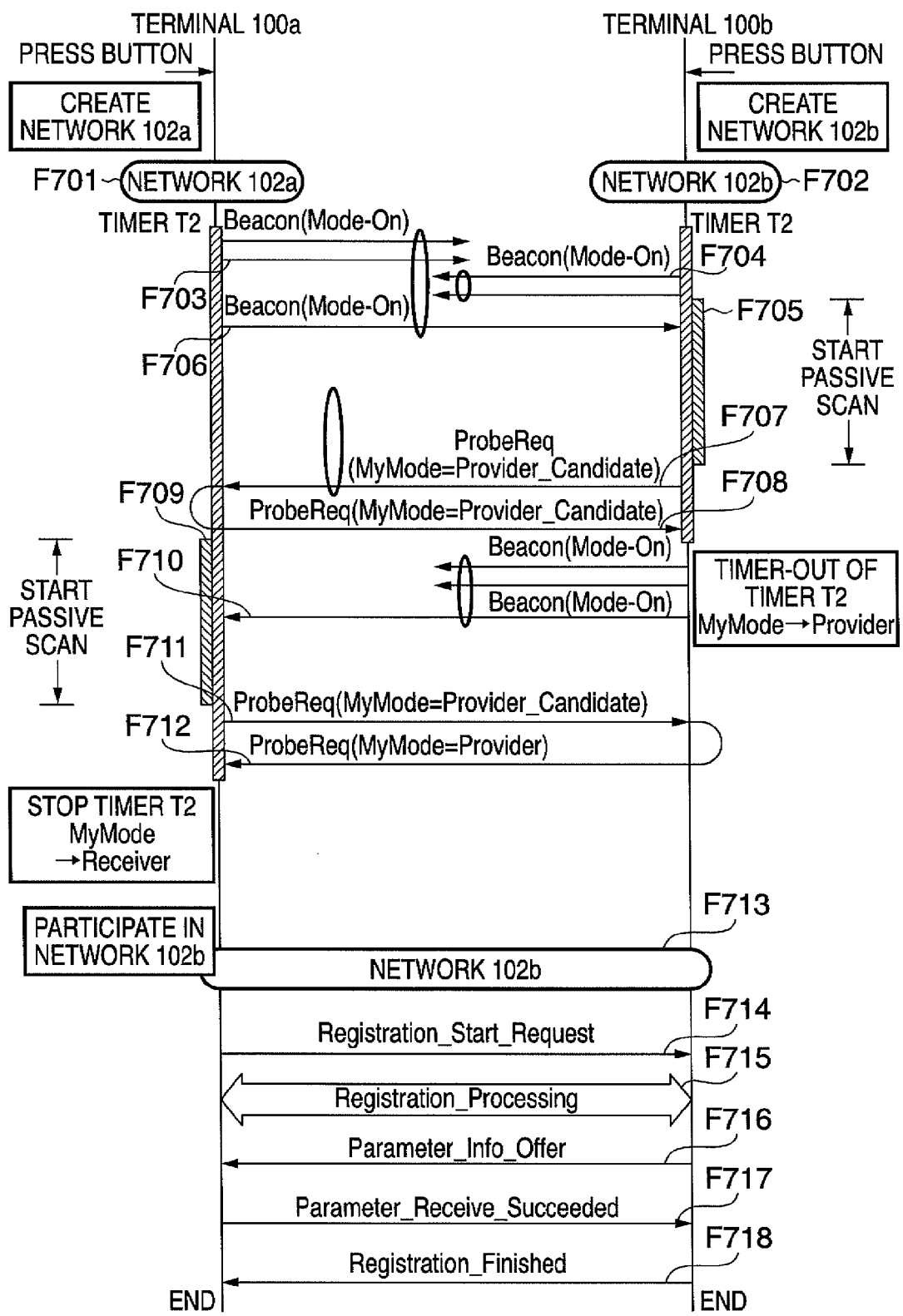
FIG. 7 is a sequence chart showing operation of terminals 100a and 100b according to the second embodiment.

FIG. 7 is a sequence chart showing processing by using a wireless LAN when a terminal 100a and the terminal 100b set wireless parameters by ad hoc communication. The operation shown in FIG. 7 is done when a program stored in a memory unit 903 runs on a control unit 902 of each terminal.

When a setting button of each of the terminals 100a and 100b is pressed for starting the wireless parameter setting, the terminals 100a and 100b create networks 102a and 102b respectively (F701). Each of the terminals 100*a* and 100*b* starts its timers T1, T2, and T3 (F702).

The terminal 100*a* transmits a beacon signal (Beacon (Mode-On)) representing that a setting mode is active on the network 102*a* (F703). The terminal 100*b* transmits a beacon signal (Beacon(Mode-On)) representing that a setting mode is active on the network 102*b* (F704).

When the time-out of the timer T3 of the terminal 100*b* existing in the network 102*b* occurs, the terminal 100*b* starts a passive scan (F705).

When the function information represents "Provider Candidate", it is abbreviated as PC hereinafter (it is indicated by "MyMode=Provider Candidate" in FIG. 7). When the function information represents "Provider", it is abbreviated as P hereinafter (it is indicated by "MyMode=Provider" in FIG. 7).

The terminal 100*b* searches for a terminal existing on a network at each frequency, and receives, as beacon information from the terminal 100*a* during the search in the network 102*a*, Beacon(Mode-On) representing that the setting mode is active (F706). Upon receiving the beacon signal, the terminal 100*b* transmits, to the terminal 100*a* which has detected the beacon of the setting mode, a Probe_Request (to be referred to as a probe request PC (ProbeRqPC) hereinafter) message in which "Provider Candidate" is set as its own function information (F707). At this time, the function information of the terminal 100*a* is also "Provider Candidate". Upon receiving the probe request PC (F707) from the terminal 100*b*, the terminal 100*a* in the network 102*a* transmits a Probe_Response (to be referred to as a probe response PC (ProbeResPC) hereinafter) message in which "Provider Candidate" as its own function information is set (F708). That is, at this time, the terminals 100*a* and 100*b* are in a state of "Provider Candidate".

When the time-out of the timer T2 of the terminal 100*b* occurs, the terminal 100*b* sets its function information to "Provider" (MyMode=Provider).

Then the time-out of the timer T3 of the terminal 100*a* occurs and the terminal 100*a* searches for a terminal existing on a network at each frequency by a passive scan (F709). The terminal 100*a* receives, as beacon information from the terminal 100*b* during the search in the network 102*b*, Beacon (Mode-On) representing that the setting mode is active (F710). The terminal 100*a* transmits, to the terminal 100*b* which has detected the beacon of the setting mode, a Probe_Request (to be referred to as a probe request PC (ProbeReqPC) hereinafter) message in which "Provider Candidate" is set as its own function information (F711). Since the terminal 100*b* in the network 102*b* is a "Provider" terminal at this time, upon receiving the probe request PC (F711) from the terminal 100*a*, the terminal 100*b* transmits a Probe_Response (to be referred to as a probe response P (ProbeResP) hereinafter) message in which "Provider" as its own function information is set (F712). The terminal 100*a* which has received the probe response P from the terminal 100*b* stops the timer T2, and sets its own function information to "Receiver" (MyMode=Receiver). In this state, it is confirmed that the terminal 100*a* is a "Receiver" terminal and the terminal 100*b* is a "Provider" terminal.

After the terminal 100*a* confirms that the function information of the terminal 100*b* is "Provider" as a result of the scan, the terminal 100*a* participates (joins) in the network 102*b* created by the terminal 100*b* (F713). Subsequently, the terminal 100*a* transmits, to the terminal 100*b*, a registration start request (Registration_Start_Request) message for requesting the start of the wireless parameter setting (F714). The terminals 100*a* and 100*b* perform protocol control of the wireless parameter setting processing to start the wireless parameter automatic setting processing (F715). Note that the terminal 100*b* transmits a registration start confirmation signal to the terminal 100*a* under the protocol control.

The terminal 100*a* receives a wireless parameter setting information (Parameter_Info_Offer) message from the terminal 100*b* (F716). The terminal 100*a* then transmits a Parameter_Receive_Succeeded response message representing the success of the reception of the wireless parameter setting information (F717). The terminal 100*b* which has confirmed the success of the reception of the wireless parameter setting information transmits a parameter setting end (Registration_Finished) message to the terminal 100*a* (F718), and terminates the processing of providing/receiving wireless parameter setting information.

As described above, it is possible to use, as a scan method, not only an active scan (the first embodiment) to cause a terminal to output a search request signal but also a passive scan (the second embodiment) to cause a terminal to check beacon information from another communication apparatus without outputting a search request.

In the second embodiment, it is checked by a beacon whether a setting mode is active in a passive scan. Function information may, however, be stored in a beacon signal and checked by receiving the beacon signal. By storing the function information in the beacon signal, it is possible to omit a probe request and probe response for checking the function information, thereby advancing to integrate networks immediately.

<Third Embodiment>

Figure 8:
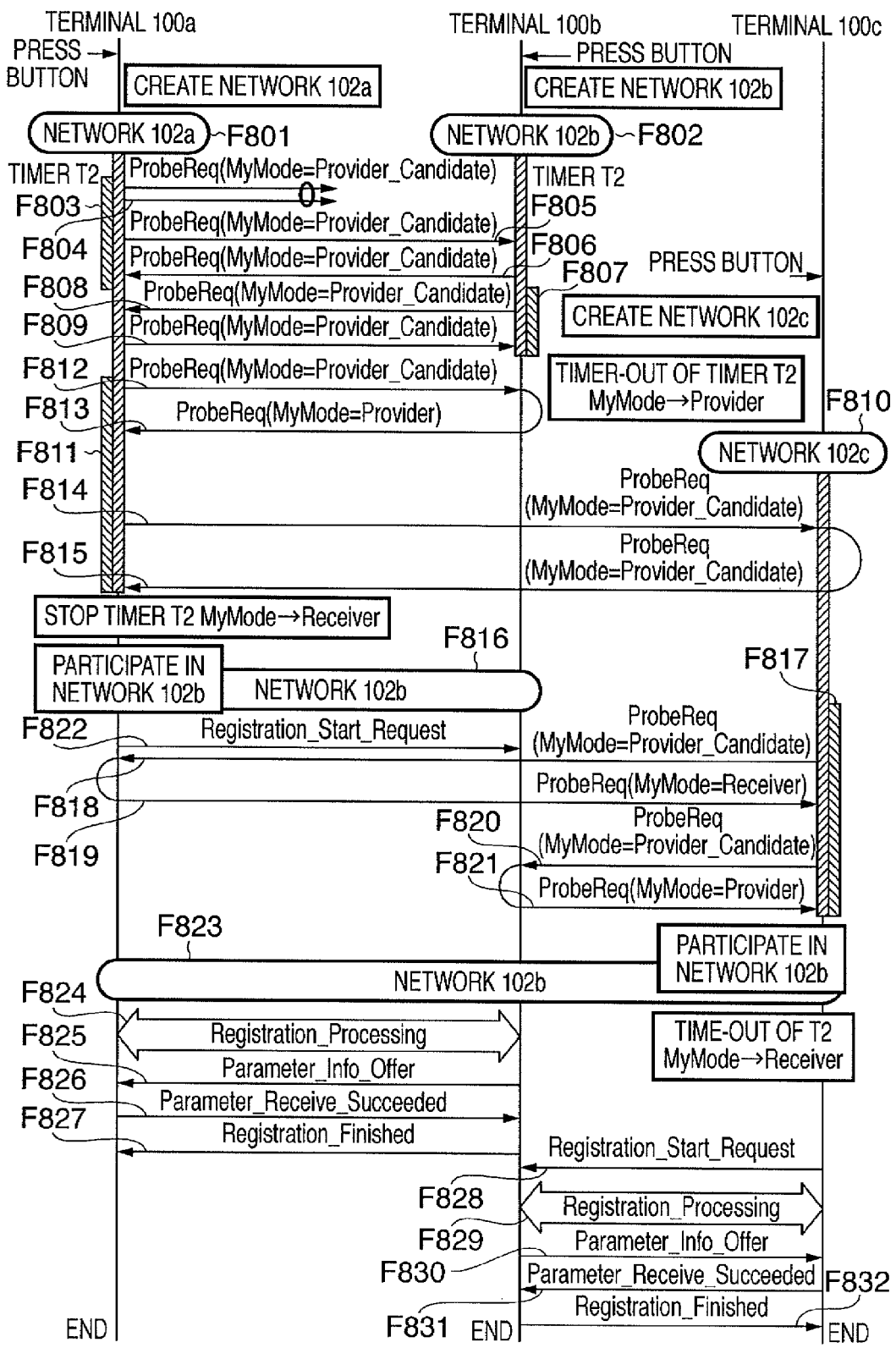
FIG. 8 is a sequence chart showing operation of terminals 100a, 100b, and 100c according to the third embodiment.

FIG. 8 is a sequence chart showing processing by using a wireless LAN when three terminals 100*a*, 100*b*, and 100*c* set wireless parameters by ad hoc communication. The configuration of the terminals 100*a*, 100*b*, and 100*c* is the same as that in FIG. 9 explained in the first embodiment, and a description thereof will be omitted. The operation shown in FIG. 8 is done when a program stored in a memory unit 903 runs on a control unit 902 of each terminal. In the third embodiment, assume that even if a terminal whose function information is "Provider" is found in scan processing, other frequencies continue to be scanned, and all frequency channels will be scanned.

When a setting button of each of the terminals 100*a* and 100*b* is pressed for starting wireless parameter setting, the terminals 100*a* and 100*b* create networks 102*a* and 102*b* respectively (F801). Each of the terminals 100*a* and 100*b* starts its timers T1, T2, and T3 (F802).

The time-out of the timer T3 of the terminal 100*a* existing in the network 102*a* occurs, and the terminal 100*a* starts an active scan (F803).

When the function information represents "Provider Candidate", it is abbreviated as PC hereinafter (it is indicated by "MyMode=Provider Candidate" in FIG. 8). When the function information represents "Provider", it is abbreviated as P hereinafter (it is indicated by "MyMode=Provider" in FIG. 8). When the function information represents "Receiver", it is abbreviated as R hereinafter (it is indicated by "MyMode=Receiver" in FIG. 8).

In order to search for a terminal existing on a network at each frequency, the terminal 100*a* transmits a Probe_Request (to be referred to as a probe request PC hereinafter) message in which "Provider Candidate" is set as its own function information (F804). When the terminal 100*a* transmits the probe request PC in the network 102*b*, the terminal 100*b* existing in the network 102*b* receives the probe request PC. In response to the probe request PC (F805) from the terminal 100*a*, the terminal 100*b* transmits a Probe_Response (to be referred to as a probe response PC hereinafter) message in which "Provider Candidate" as its own function information is set (F806).

The time-out of the timer T3 of the terminal 100b existing in the network 102b occurs, and the terminal 100b starts an active scan (F807). In order to search for a terminal existing on a network at each frequency, the terminal 100b transmits a probe request PC in which "Provider Candidate" is set as its own function information (F808). When the terminal 100b transmits the probe request PC in the network 102a, the terminal 100a existing in the network 102a transmits a probe response PC in which "Provider Candidate" as its own function information is set in response to the probe request PC (F808) from the terminal 100b (F809).

The time-out of the timer T2 of the terminal 100b occurs. The terminal 100b confirms its function as "Provider" (MyMode=Provider).

After that, when the time-out of the timer T3 of the terminal 100a occurs again, the terminal 100a executes the scan again (F811), and the terminal 100a transmits a probe request PC in which "Provider Candidate" is set as its own function information (F812). Upon transmitting the probe request PC in the network 102b (F812), the terminal 100a receives, as a response, a probe response P from the terminal 100b existing in the network 102b (F813). Assume that when a setting button of the terminal 100c is pressed for starting wireless parameter setting at the same time, the terminal 100c creates a network 102c and starts timers (F810).

In this case, the terminal 100c receives a probe request PC from the terminal 100a by executing the scan processing of the terminal 100a (F814). The terminal 100c transmits a probe response PC as a response signal (F815).

The terminal 100a confirms that the function information of the terminal 100b existing in the network 102b is "Provider" as a result of scanning all the frequencies. Consequently, the terminal 100a stops the timer T2, and sets its function information to "Receiver" (MyMode=Receiver). The terminal 100a participates (joins) in the network 102b created by the terminal 100b (F816).

Subsequently, the terminal 100a transmits, to the terminal 100b, a Registration_Start_Request message for requesting the start of wireless parameter setting (F822). At this time, the terminal 100c existing in the network 102c starts an active scan (F817), and transmits a probe request PC in which its own function information is set to "Provider Candidate". Upon scanning the network 102a, the terminal 100c transmits a probe request PC to the network 102a (F818). Even though the terminal 100a participates (joins) in the network 102b, the terminal 100a creates the network 102a. Consequently, the terminal 100a receives the probe request PC (F818) transmitted by the terminal 100c, and returns a probe response R as a response at a frequency at which the network 102a exists (F819). When the terminal 100c searches a frequency at which the network 102b exists, the terminal 100b receives a probe request PC (F820) transmitted by the terminal 100c, and returns a probe response P as a response (F821).

Since the terminal 100c receives the probe response P from the terminal 100b, the terminal 100c stops the timer T2, and sets its function information to "Receiver" (MyMode=Receiver). After the terminal 100c confirms that the function information of the terminal 100b is "Provider" as a result of the scan, the terminal 100c participates (joins) in the network 102b created by the terminal 100b (F823).

At this time, the terminals 100a, 100b, and 100c join the integrated network 102b.

The parameter setting processing of the terminals 100a and 100b will be considered again.

The terminals 100a and 100b perform protocol control of the wireless parameter setting processing (F824).

The terminal 100a acquires wireless parameter setting information from the terminal 100b through a Parameter_Info_Offer message (F825), and transmits a Parameter_Receive_Succeeded response message representing the success of the acquisition (F826). After the message representing the success of the acquisition of the wireless parameter setting information is transmitted, the terminal 100a waits for a message representing parameter setting end transmitted by the terminal 100b (F827), and terminates the processing.

Similarly, the parameter setting processing of the terminals 100b and 100c is subsequently performed. The terminal 100c transmits, to the terminal 100b, a Registration_Start_Request message for requesting the start of wireless parameter setting (F828), and executes protocol control of the wireless parameter setting processing (F829). The terminal 100c acquires wireless parameter setting information from the terminal 100b through a Parameter_Info_Offer message (F830).

After a Parameter_Receive_Succeeded response message representing the success of the acquisition is transmitted (F831), the terminal 100c waits for a message representing wireless parameter setting end transmitted by the terminal 100b (F832), and terminates the processing.

Although an active scan has been explained as an example in the third embodiment, a passive scan may be used.

As described above, each communication apparatus searches for a network in which a communication apparatus whose function information is "Provider" exists, and participates (joins) in the network after a "Provider" apparatus is found. With this processing, even if a plurality of apparatuses create different networks, it is possible to integrate the networks into one network. Each apparatus can uniquely confirm a functional role in parameter setting, and execute the setting processing.

<Fourth Embodiment>

In the first to third embodiments mentioned above, after each terminal sets function information, the terminals participate (join) in the single network, and immediately start wireless parameter setting processing.

After function information is set to "Provider", it may, however, take time until the activation of a wireless parameter providing function is complete. That is, even if it is declared that a terminal is a "Provider" terminal in step S314 of FIG. 3B, F512 of FIG. 5, F712 of FIG. 7, and F813 and F821 of FIG. 8 in the first to third embodiments, the activation of the providing function may not be complete yet. The reason why it takes time until the activation of the wireless parameter providing function is complete is as follows. That is, an initialization process of an encryption algorithm, calculation of an encryption key, generation of random numbers for the calculation of the encryption key, and the like are executed to encrypt communication contents in wireless parameter setting. If communication apparatuses having a communication function to which the present invention is applicable are, e.g., game machines and household appliances, processing capability of a processor used for the communication function is low in many cases, thereby taking much time to activate the function.

Even if a "Provider" terminal in which the activation of its providing function is not complete and a "Receiver" terminal continue wireless parameter automatic setting processing, the wireless parameter automatic setting cannot be done, and an error occurs.

In the fourth embodiment, before the operation of providing/receiving wireless parameters starts, a terminal whose function information is set to "Receiver" grasps a function activation state of a terminal whose function information is set to "Provider", and then protocol control of wireless parameter setting processing can be started.

After a plurality of terminals set their function information, the terminals participate (join) in the same network under the control explained in the first to third embodiments. It is confirmed that the terminals exist in the same network, and then protocol control of wireless parameter setting processing can be started.

An embodiment for improving the certainty of the wireless parameter setting processing will be explained as the fourth embodiment.

The control operation after terminals integrate a plurality of networks into one network under the control described in the above first to third embodiments will be explained below. The control operation of integrating the networks is the same as that in any of the first to third embodiments, and a description thereof will be omitted.

Figure 10:
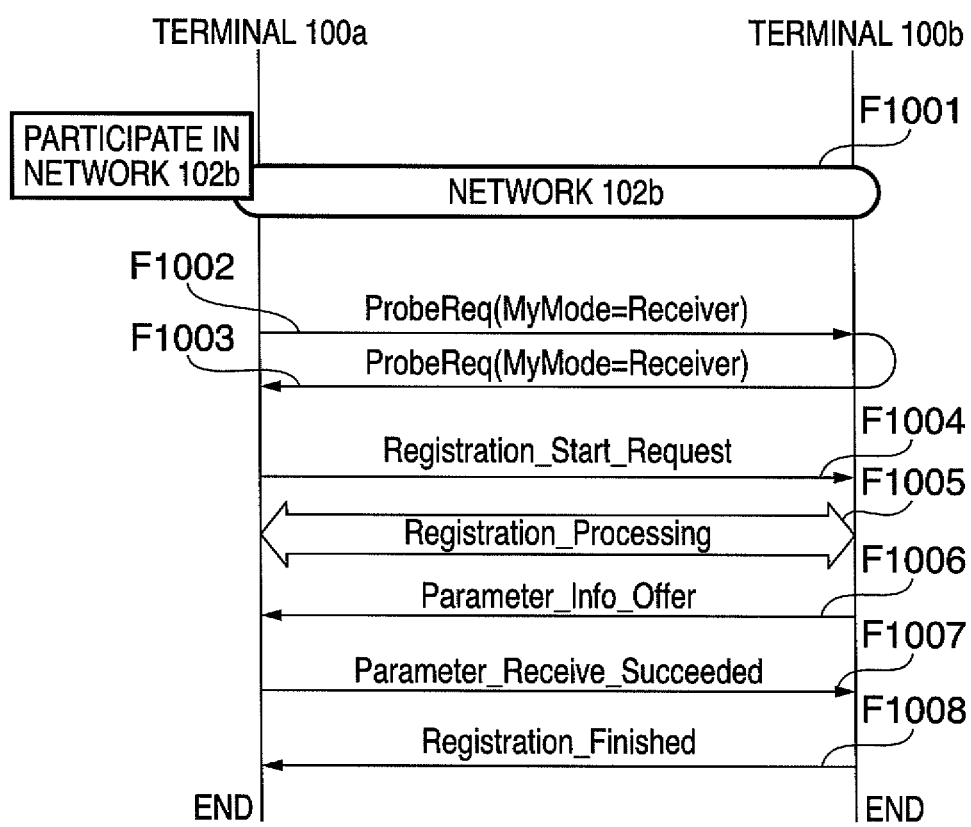
FIG. 10 is a sequence chart showing operation of terminals 100a and 100b according to the fourth embodiment.

FIG. 10 is a sequence chart showing processing when terminals 100a and 100b executes wireless parameter setting processing by using ad hoc communication and function information of the terminals 100a and 100b has been already set. The operation shown in FIG. 10 is done when a program stored in a memory unit 903 runs on a control unit 902 of each terminal.

Prior to the sequence chart, the terminal 100a sets its function information to "Receiver" and the terminal 100b sets its function information to "Provider" (see the first to third embodiments).

Since the function information has been decided, the terminal 100a which has set its function information to "Receiver" participates (joins) in a network 102b created by the terminal 100b whose function information is set to "Provider" (F1001). When the terminal 100a participates (joins) in the network 102b, the terminal 100a transmits a registration start request (Registration_Start_Request) message in the first to third embodiments. In the fourth embodiment, upon participating (joining) in the network 102b, the terminal 100a checks whether the terminal 100b is in a state in which a function as a "Provider" terminal can be immediately performed (the terminal 100a checks whether the activation of the wireless parameter providing function is complete).

The terminal 100a transmits a Probe_Request (to be referred to as a probe request R hereinafter) message in which "Receiver" is set as its own function information in order to check the presence and a function activation state of the terminal 100b (F1002).

Upon receiving the probe request R from the terminal 100a, the terminal 100b transmits a Probe_Response (to be referred to as a probe response P hereinafter) message in which "Provider" is set as its own function information if the activation of its own parameter providing function is complete (F1003). If the activation of the parameter providing function is not complete, the terminal 100b returns a message representing "unactivated" or returns no response.

Upon receiving the probe response P, the terminal 100a transmits, to the terminal 100b, a Registration_Start_Request message for requesting the start of wireless parameter setting (F1004), and executes protocol control of the wireless parameter setting processing (F1005). Upon acquiring wireless parameter setting information from the terminal 100b through a Parameter_Info_Offer message (F1006), the terminal 100a transmits, to the terminal 100b, a Parameter_Receive_Succeeded response message representing the success of the acquisition (F1007). The terminal 100b which has confirmed that the success of the reception of the wireless parameter setting information transmits a wireless parameter setting end (Registration_Finished) message to the terminal 100a (F1008), and terminates the processing of providing/receiving the wireless parameter setting information.

The sequence in the terminals 100a and 100b in the fourth embodiment has been described, and it is an example in which two terminals create an ad hoc network.

Figure 11:
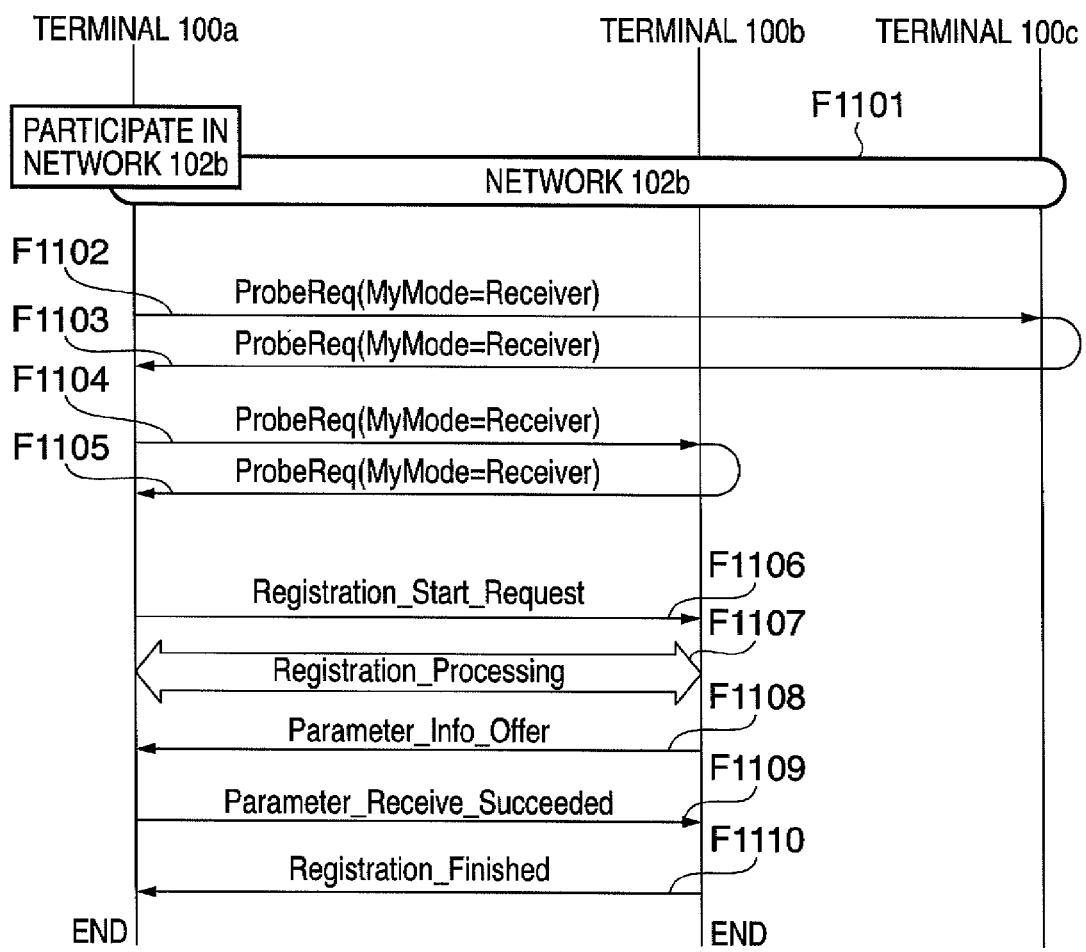
FIG. 11 is a sequence chart showing operation of the terminals 100a and 100b and a terminal 100c according to the fourth embodiment.

FIG. 11 is a sequence chart showing processing when the terminals 100a and 100b and a terminal 100c execute wireless parameter setting by ad hoc communication and the function information of the terminals 100a, 100b, and 100c have been set. The operation shown in FIG. 11 is done when a program stored in a memory unit 903 runs on a control unit 902 of each terminal.

Prior to the sequence chart, the terminals 100a and 100c set their function information to "Receiver" and the terminal 100b sets its function information to "Provider" (see the third embodiment).

Since the function information has been decided, the terminals 100a and 100c whose function information is set to "Receiver" participate (join) in the network 102b created by the terminal 100b whose function information is set to "Provider" (F1101).

Subsequently, the terminal 100a transmits a Probe_Request (to be referred to as a probe request R) message in which "Receiver" is set as its own function information in order to check the presence and function activation state of the terminal 100b (F1102).

In accordance with the network status, the probe request R transmitted by the terminal 100a can reach to the terminal 100c in which "Receiver" is set as its own function information (F1102). Upon receiving the probe request R from the terminal 100a, the terminal 100c transmits a Probe_Response (to be referred to as a probe response R hereinafter) message in which "Receiver" is set as its own function information (F1103). In this case, the terminal 100a retransmits the probe request R, since the terminal 100a could not confirm the presence of the terminal 100b whose function information is set to "Provider" (F1104). Note that the probe request R may be a broadcast packet. It is, therefore, possible to receive a probe response P as a response to the probe request R in F1102 without retransmitting the probe request R in F1104.

Upon receiving the probe request R from the terminal 100a, the terminal 100b transmits a Probe_Response (to be referred to as a probe response P hereinafter) message in which "Provider" is set as its own function information if the activation of its own parameter providing function is complete (F1105). If the activation of the wireless parameter setting information providing function is not complete, the terminal 100b returns a message representing "unactivated" or returns no response.

Upon receiving the probe response P, the terminal 100a transmits, to the terminal 100b, a Registration_Start_Request message for requesting the start of wireless parameter setting (F1106), and executes protocol control of the wireless parameter setting processing (F1107). Upon acquiring wireless parameter setting information from the terminal 100b through a Parameter_Info_Offer message (F1108), the terminal 100a transmits, to the terminal 100b, a Parameter_Receive_Succeeded response message representing the success of the acquisition (F1109). The terminal 100b which has confirmed the success of the reception of the wireless parameter setting information transmits a wireless parameter setting end (Registration_Finished) message to the terminal 100a (F1110), and terminates the processing of providing/receiving the wireless parameter setting information.

Similarly, the terminal 100c transmits a probe request R to the terminal 100b. Upon receiving a probe response P, the terminal 100c starts protocol control of wireless parameter setting processing, and receives wireless parameter setting information from the terminal 100b (not shown).

As explained above, when three or more terminals participate (join) in a network, a terminal whose function information is set to "Receiver" reconfirms the presence of the terminal 100b whose function information is set to "Provider". This allows to reliably specify a destination terminal which is requested to start wireless parameter setting.

Processing in each terminal will now be described with using a detail flowchart.

Figure 12:
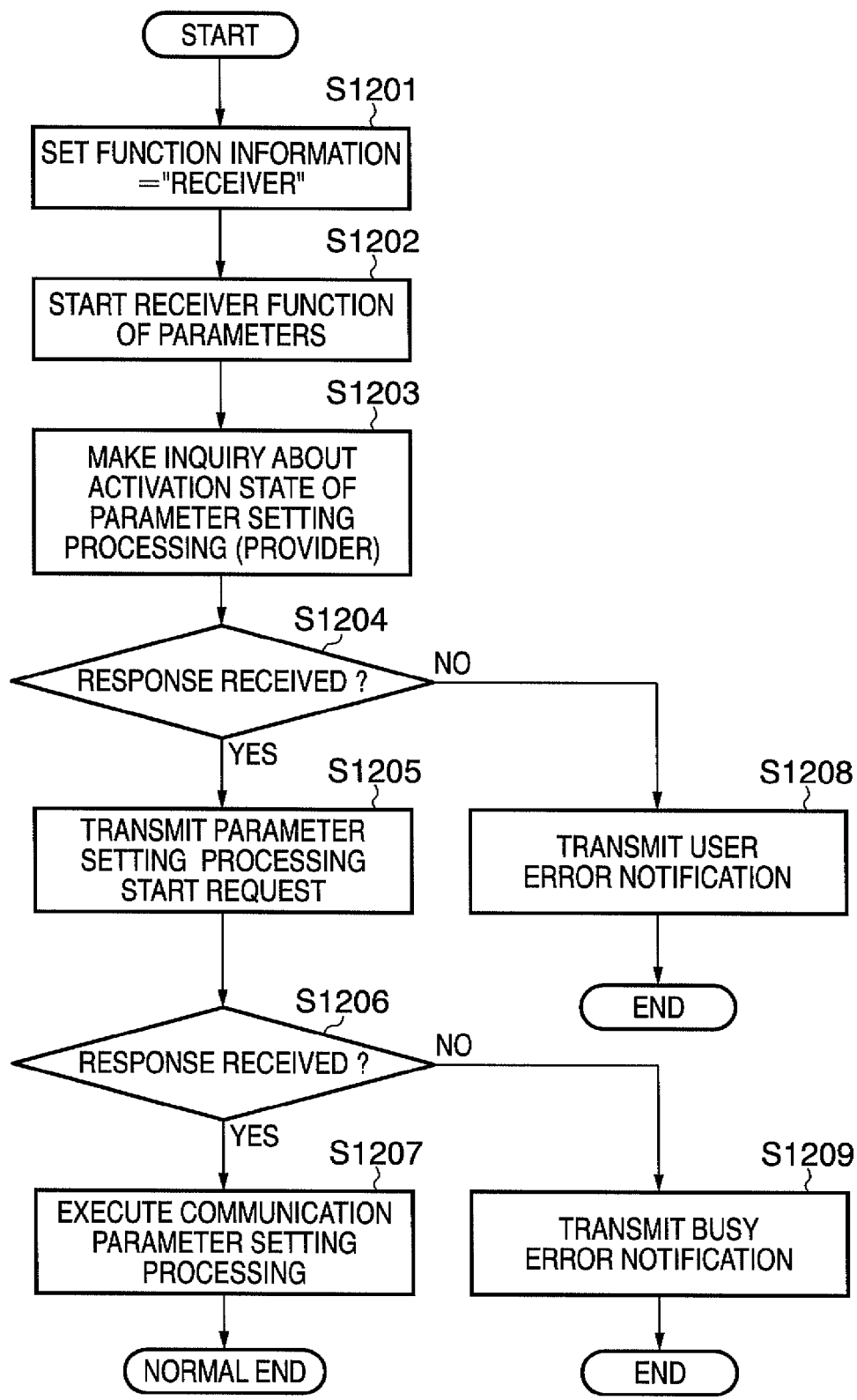
FIG. 12 is a flowchart showing operation of the terminals 100a and 100c according to the fourth embodiment.

FIG. 12 is a flowchart showing operation of a "Receiver" terminal (the terminal 100a or 100c) in the fourth embodiment. The operation shown in FIG. 12 is done when the program stored in the memory unit 903 runs on the control unit 902 of the "Receiver" terminal. For the sake of simplicity, assume that a "Receiver" terminal is the terminal 100a and a "Provider" terminal is the terminal 100b. The operation in FIG. 12 is performed after the terminal 100a participates (joins) in the network 102b of the terminal 100b.

The function information of the terminals 100a and 100b has already been set, and the function information of the terminal 100a is set to "Receiver" (step S1201). The terminal 100a whose function information is confirmed as "Receiver" activates a "Receiver" function under protocol control of parameter setting processing (step S1202).

Upon completion of the activation of the function as the "Receiver" terminal, the terminal 100a transmits a probe request R to the terminal 100b to inquire whether the activation of a "Provider" function under the protocol control of the wireless parameter setting processing is complete (step S1203).

The terminal 100a is in a standby state for a period of time to wait for a response to the inquiry about the activation state to the terminal 100b (step S1204). If the terminal 100a receives no response representing the completion of the activation of the providing function from the terminal 100b within the period of time, the terminal 100a notifies a user of a user error, and terminates the processing (step S1208).

In FIG. 12, only one inquiry is made, the user is notified of the user error, and the processing is terminated. A retransmission timer may be provided to make a plurality of inquiries. In this case, if there is no response representing the completion of the activation of the providing function from the terminal 100b through a predetermined number of attempts, the terminal 100a notifies the user of the user error, and terminates the processing. As will be explained later, when the terminal 100a receives a message representing "unactivated" as a response to the inquiry about the activation state, the inquiry about the activation state may be made until the terminal 100a receives a message representing "activated" or receives no response after the elapse of the period of time.

During the standby state in which the terminal 100a waits for a response to the inquiry about the activation state in step S1204, upon receiving a response representing the completion of the activation of the providing function from the terminal 100b, the terminal 100a transmits, to the terminal 100b, a Registration_Start_Request message for requesting the start of wireless parameter setting (step S1205).

The terminal 100a is in the standby state for a period of time to wait for a response to the Registration_Start_Request message transmitted to the terminal 100b (step S1206). If there is no response to the Registration_Start_Request message from the terminal 100b (step S1206), the terminal 100a determines that parameter setting has started between the terminal 100b and another terminal. Consequently, the terminal 100a notifies a user of a busy error, and terminates the processing (step S1209). In FIG. 12, a parameter setting start request is transmitted once. If there is no response, a user is notified of a busy error and the processing is terminated. A retransmission timer may, however, be provided to make a plurality of inquiries. In this case, if there is no response from the terminal 100b through a predetermined number of attempts, the terminal 100a notifies the user of the busy error, and terminates the processing.

Upon receiving a response to the Registration_Start_Request message from the terminal 100b (step S1206), the terminal 100a executes protocol control of the parameter setting processing (step S1207).

FIG. 13 is a flowchart showing operation of the terminal 100b according to the fourth embodiment. The operation shown in FIG. 13 is done when the program stored in the memory unit 903 runs on the control unit 902 of the terminal 100b as a "Provider" terminal. The operation in FIG. 13 starts when the terminal 100b is confirmed as a "Provider" terminal (step S310 in FIG. 3A).

If the function information of the terminals 100a and 100b has been set and the function information of the terminal 100b is set to "Provider" (step S1301), a function as a "Provider" terminal is activated to start a necessary initialization process (step S1302). At this time, since the initialization process of the function as the "Provider" terminal is not complete, the function activation state is managed to be "unactivated".

After that, the terminal 100b determines whether a Probe_Request (to be referred to as a probe request PC hereinafter) message in which "Provider Candidate" is set as function information is received (step S1303). If the terminal 100b receives the probe request PC, it returns a probe response P (step S1309). If the terminal 100b does not receive the probe request PC, it determines whether a Probe_Request (to be referred to as a probe request R hereinafter) message in which "Receiver" is set as function information is received (step S1304). If the terminal 100b does not receive the probe request R, it determines whether the initialization process of the function as the "Provider" terminal is complete (step S1305). If the initialization process is not complete, the process returns to step S1303. If the initialization process is complete, the activation state of the function as the "Provider" terminal is changed from "unactivated" to "activated" (step S1306) and the process returns to step S1303.

If the terminal 100b receives the probe request R in step S1304, it determines whether the function activation state is "unactivated" or "activated" (step S1307). If the state is "activated", the terminal 100b returns a probe response P (step S1309) and the process advances to step S315 in FIG. 3B to perform the above-described processing. That is, the terminal 100b executes the processing of providing wireless parameter setting information as the "Provider" terminal in FIGS. 3A, 3B, 5, 7, 8, 10, and 11.

If the state is not "activated", the initialization process is not complete and the state is "unactivated". Therefore, the terminal 100b does not respond to the probe request R or returns a response representing "unactivated" (step S1308). Note that if the terminal 100b does not respond to the probe request R in step S1308, a "Receiver" terminal (the terminal 100a) confirms that a terminal whose function activation state is "activated" does not exist. On the other hand, if the terminal 100b returns a response representing "unactivated", the "Receiver" terminal (the terminal 100a) can confirm that the "Provider" terminal has not been prepared. The "Receiver" terminal can retransmit the probe request R until the activation is complete, and wait for the wireless parameter setting processing to be carried on until the activation is complete.

As explained above, according to the fourth embodiment, when a "Receiver" terminal checks a state of a "Provider" terminal, it is possible to avoid abnormal end caused by a state in which a "Provider" terminal has not been prepared.

As described above, according the present invention, even if a plurality of communication apparatuses create different networks, it is possible to execute setting processing of providing/receiving wireless parameters. In accordance with a role in the setting processing of providing/receiving communication parameters, it is also possible to integrate the plurality of networks into one network, and perform the setting processing. When wireless parameters are set by ad hoc communication, even if a user does not specify whether the role is of a provider terminal or a receiver terminal for the wireless parameter setting, it is possible to determine networks in which communication apparatuses can autonomously communicate with each other. After that, the networks can be integrated, and the wireless parameter setting processing can be performed in accordance with the role.

A communication apparatus can search for networks by various methods, such as an active scan to cause the communication apparatus to output a search request signal, and a passive scan to cause the communication apparatus to receive a signal (e.g., beacon information) from another communication apparatus without outputting a search request.

Assume that a communication apparatus functions as a provider apparatus of communication parameters. In this case, even if it takes time to activate the function as the provider apparatus, it is possible to perform setting processing of providing/receiving the communication parameters.

Although a wireless LAN ad hoc mode complying with the IEEE802.11 has been explained in the above embodiments, the present invention is also applicable to a case in which communication parameters of other communication schemes are set between terminals by other communication schemes. Other communication schemes include Bluetooth®, UWB (WUSB (wireless USB), wireless 1394, and WINET), ZigBee, and MBOA (Multi Band OFDM Alliance). Furthermore, the present invention may be implemented in a wired communication medium such as a wired LAN.

Although a network identifier, encryption scheme, encryption key, authentication scheme, and authentication key are used as examples of communication parameters, another information may be used and also included in communication parameters.

(Other Embodiments)

The present invention is also achieved by supplying, to a system or apparatus directly or from a remote place, a program for implementing the functions of the above-mentioned embodiments, and reading out and executing the supplied program codes by the system or apparatus. The present invention therefore incorporates program codes installed in the computer in order to implement functional processes of the present invention by the computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-017879, filed Jan. 29, 2007 which is hereby incorporated by reference herein in its entirety.

The invention claimed is:

1. A communication apparatus comprising:
a creation unit constructed to create a network;
a search unit constructed to search for another network after the network is created by said creation unit;
a determination unit constructed to determine a role of another communication apparatus in a setting procedure for setting a communication parameter, wherein the other communication apparatus resides in the other network searched by said search unit;
a join unit constructed to join the other network, if it is determined by the determination unit that the role of the other communication apparatus residing in the other network is a provider of communication parameters;
a setting unit constructed to execute the communication parameter setting procedure with the other communication apparatus in the other network joined by said join unit;
a decision unit constructed to decide a role of the communication apparatus for the communication parameter setting procedure; and
a notification unit constructed to notify the other communication apparatus of the role decided by said decision unit,
wherein said notification unit notifies the other communication apparatus of an activation state of the role decided by said decision unit.

2. The apparatus according to claim 1, wherein said notification unit transmits a notification representing whether the activation of the role decided by said decision unit is complete.

3. A communication apparatus comprising:
a creation unit constructed to create a network;
a search unit constructed to search for another network after the network is created by said creation unit;
a determination unit constructed to determine a role of another communication apparatus in a setting procedure for setting a communication parameter, wherein the other communication apparatus resides in the other network searched by said search unit;
a join unit constructed to join the other network, if it is determined by the determination unit that the role of the other communication apparatus residing in the other network is a provider of communication parameters;
a setting unit constructed to execute the communication parameter setting procedure with the other communication apparatus in the other network joined by said join unit;
a decision unit constructed to decide a role of the communication apparatus for the communication parameter setting procedure; and
a notification unit constructed to notify the other communication apparatus of the role decided by said decision unit, wherein said notification unit notifies the other communication apparatus of the role decided by said decision unit in accordance with whether the activation of the role decided by said decision unit is complete.

4. A communication method for a communication apparatus, comprising the steps of:
creating a network;
searching for another network after the network is created;
determining a role of another communication apparatus in a setting procedure for setting a communication parameter, wherein the other communication apparatus resides in the searched other network;

joining the other network, if it is determined that the role of the other communication apparatus residing in the other network is a provider of communication parameters;

executing the communication parameter setting procedure with the other communication apparatus in the joined other network;

deciding a role of the communication apparatus for the communication parameter setting procedure; and notifying the other communication apparatus of the decided role, wherein said notifying step notifies the other communication apparatus of an activation state of the role decided by said deciding step.

5. A communication method for a communication apparatus, comprising the steps of:

creating a network;

searching for another network after the network is created;

determining a role of another communication apparatus in a setting procedure for setting a communication parameter, wherein the other communication apparatus resides in the searched other network;

joining the other network, if it is determined that the role of the other communication apparatus residing in the other network is a provider of communication parameters;

executing the communication parameter setting procedure with the other communication apparatus in the joined other network;

deciding a role of the communication apparatus for the communication parameter setting procedure; and notifying the other communication apparatus of the decided role, wherein said notifying step notifies the other communication apparatus of the role decided by said deciding step in accordance with whether the activation of the role decided by said deciding step is complete.

6. A communication apparatus comprising:

a creation unit constructed to create a first network;

a search unit constructed to search for another network after the first network is created by said creation unit;

a detecting unit constructed to detect a provider apparatus residing in the other network searched by said search unit, wherein a role of the provider apparatus in a communication parameter setting procedure is to provide communication parameters;

a join unit constructed to join a second network, if the detecting unit detects the provider apparatus in the second network while the role of the communication apparatus is not the provider of the communication parameters;

an executing unit constructed to execute, as a receiver apparatus, the communication parameter setting procedure with the provider apparatus in the second network joined by said join unit and to receive the communication parameters from the provider apparatus, wherein a role of the receiver apparatus in the communication parameter setting procedure is to receive communication parameters; and a notification unit constructed to notify an another communication apparatus of the role of the communication apparatus for communication parameter setting procedure, wherein said notification unit notifies the other communication apparatus of an activation state of the role of the communication apparatus for communication parameter setting procedure.

7. The apparatus according to claim 6, wherein said notification unit transmits a notification representing whether the activation of the role of the communication apparatus for communication parameter setting procedure is complete.

8. A communication apparatus comprising:

a creation unit constructed to create a first network;

a search unit constructed to search for another network after the first network is created by said creation unit;

a detecting unit constructed to detect a provider apparatus residing in the other network searched by said search unit, wherein a role of the provider apparatus in a communication parameter setting procedure is to provide communication parameters;

a join unit constructed to join a second network, if the detecting unit detects the provider apparatus in the second network while the role of the communication apparatus is not the provider of the communication parameters;

an executing unit constructed to execute, as a receiver apparatus, the communication parameter setting procedure with the provider apparatus in the second network joined by said join unit and to receive the communication parameters from the provider apparatus, wherein a role of the receiver apparatus in the communication parameter setting procedure is to receive communication parameters; and a notification unit constructed to notify an another communication apparatus of the role of the communication apparatus for communication parameter setting procedure, wherein said notification unit notifies the other communication apparatus of the role of the communication apparatus for communication parameter setting procedure in accordance with whether the activation of the role of the communication apparatus for communication parameter setting procedure is complete.

* * * * *